(12) United States Patent
Hagai et al.

(10) Patent No.: US 7,446,903 B2
(45) Date of Patent: Nov. 4, 2008

(54) IMAGE PROCESSING DEVICE

(75) Inventors: Naoki Hagai, Komaki (JP); Masashi Kuno, Ohbu (JP); Masaki Kondo, Toyoake (JP); Masashi Ueda, Nagoya (JP); Masahiro Nishihara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 919 days.

(21) Appl. No.: 10/254,578

(22) Filed: Sep. 26, 2002

(65) Prior Publication Data

US 2003/0072035 A1 Apr. 17, 2003

(30) Foreign Application Priority Data

Sep. 27, 2001 (JP) .............. P2001-295566

(51) Int. Cl.
*G06K 15/00* (2006.01)
(52) U.S. Cl. .............. 358/3.03; 358/2.1; 358/3.05; 382/112; 382/252; 382/270
(58) Field of Classification Search .............. 358/2.1, 358/3.03, 3.05, 3.21, 3.22, 3.24, 504, 462; 382/112, 252, 270
See application file for complete search history.

(56) References Cited

U.S. PATENT DOCUMENTS

| | | | | |
|---|---|---|---|---|
| 4,680,645 A | * | 7/1987 | Dispoto et al. .............. 358/3.02 |
| 5,402,245 A | * | 3/1995 | Motta et al. .............. 358/1.9 |
| 5,847,724 A | * | 12/1998 | Mantell .............. 347/15 |
| 6,144,775 A | * | 11/2000 | Williams et al. .............. 382/252 |
| 6,157,469 A | * | 12/2000 | Mestha .............. 358/504 |
| 6,172,768 B1 | * | 1/2001 | Yamada et al. .............. 358/1.9 |
| 6,226,108 B1 | * | 5/2001 | Toyohara et al. .............. 358/519 |
| 6,563,957 B1 | * | 5/2003 | Li et al. .............. 382/252 |
| 6,876,468 B1 | * | 4/2005 | Kanno et al. .............. 358/1.9 |
| 6,995,868 B2 | * | 2/2006 | Quintana et al. .............. 358/1.9 |
| 7,110,141 B2 | * | 9/2006 | Yamamoto .............. 358/1.9 |

* cited by examiner

*Primary Examiner*—David K Moore
*Assistant Examiner*—Benjamin O Dulaney
(74) *Attorney, Agent, or Firm*—Oliff & Berridge, PLC

(57) ABSTRACT

An error utilization factor line, indicative of a relationship between the amount of the error utilization factor K and input data for a present pixel, is determined dependently on characteristics of the image, on the value of the threshold, on the size of the distribution matrix, or on the condition of the recording operation. The amount of the error utilization factor K is determined dependently on the input data of the present pixel and based on the error utilization factor line. The correction amount F, collected from the already-processed nearby pixel, is multiplied by the error utilization factor K, before being added to the input data of the present pixel for the halftone process.

8 Claims, 20 Drawing Sheets

FIG.7(A)

ThT

| THRESHOLD | CYAN | MAGENTA | YELLOW | BLACK | LIGHT CYAN | LIGHT MAGENTA |
|---|---|---|---|---|---|---|
| "Tc" FOR SMALL DOT | 0 | 0 | 0 | 0 | 0 | 0 |
| "Tb" FOR MEDIUM DOT | 96 | 100 | 120 | 115 | 102 | 101 |
| "Ta" FOR LARGE DOT | 176 | 187 | 240 | 210 | 207 | 183 |

| OUTPUT DOT | CYAN | MAGENTA | YELLOW | BLACK | LIGHT CYAN | LIGHT MAGENTA |
|---|---|---|---|---|---|---|
| NONE | 0 | 0 | 0 | 0 | 0 | 0 |
| SMALL DOT | 60 | 100 | 120 | 115 | 102 | 101 |
| MEDIUM DOT | 176 | 187 | 240 | 210 | 207 | 183 |
| LARGE DOT | 255 | 255 | 255 | 255 | 255 | 255 |

FIG.7(C)

→ SCANNING DIRECTION X OF CARRIAGE

| 1/48 | 3/48 | 5/48 | 3/48 | 1/48 |
|---|---|---|---|---|
| 3/48 | 5/48 | 7/48 | 5/48 | 3/48 |
| 5/48 | 7/48 | * | | |

↓ FEEDING DIRECTION Y OF SHEET OF PAPER

DM

|  | A | B | C | D |
|---|---|---|---|---|
| GLOSSY PAPER | 0.5 | 1 | 20 | 30 |
| RECYCLED PAPER | 0.9 | 1 | 20 | 30 |

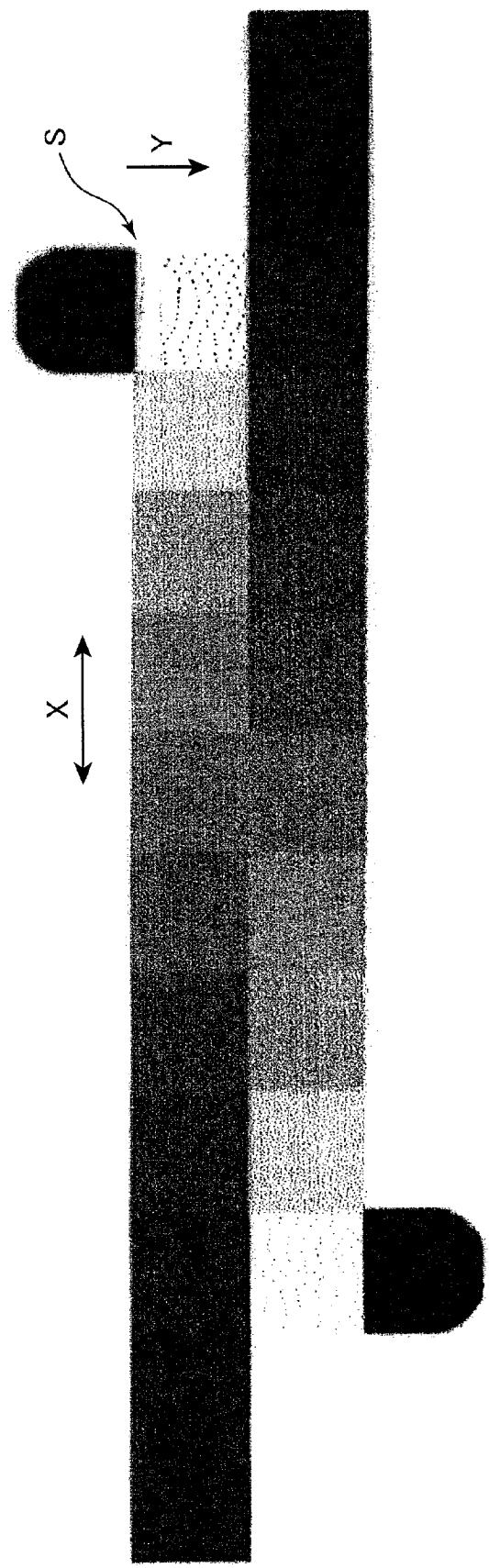

IMAGE PROCESSING DEVICE

BACKGROUND OF THE INVENTION

1. Field of the Invention

The present invention relates to an image processing device and an image processing program for rapidly processing image data and rendering advanced gradations.

2. Description of Related Art

In recent years, color printers of the type that eject multiple colors of ink from the print head, commonly known as inkjet printers, have become widely popularized as a computer output device. These inkjet printers are widely used to print images that have been processed by a computer or the like in multiple colors and multiple gradations. The color printer renders gradations according to a halftone process that distributes dots according to inputted gradation data.

One method of this halftone process is the error diffusion method. Currently, the error diffusion method is the method most commonly used to reproduce high quality images. To describe the process more specifically, the differences between input values and output values generated for neighboring pixels are stored as error values. The saved error values are collected using a distribution matrix. The collected values are used as feedback for the inputted density of unprocessed pixels. By performing such a feedback process with these error values, it is possible to improve the reproduction of density level on a macro scale.

In addition to the error diffusion method, the dithering method is another halftone processing method that is frequently used. The dithering method determines an output level after comparing input values one-on-one with preset threshold values in a threshold matrix, achieving quick dot output without generating recurrent patterns common to the error diffusion method.

SUMMARY OF THE INVENTION

Since the above-described error diffusion method can improve image quality with its ability to greatly reduce error over the entire image compared to other methods used to control dot formation, this method is superior in high-density reproducibility. However, the error diffusion method is associated with such problems as delayed dot output when rendering half-tone of low density levels, the generation of recurrent patterns, and the generation of false contours.

On the other hand, the dither method can achieve fast dot output without generating such recurrent patterns associated with the error diffusion method. However, the dither method has poor density reproducibility on a macro-scale and invites degradation in image quality caused by periodic patterns in localized regions.

In view of the foregoing, it is an object of the present invention to provide, an image processing device and image processing program having better density reproducibility, while being capable of preventing delay in dot output over the entire image, being capable of preventing then generation of recurrent patterns and false contours, and being capable of easily reproducing an image desired by the user by obtaining prescribed image processing characteristics.

In order to attain the above and other objects, the present invention provides an image processing device, comprising: an inputting portion receiving input data indicative of one pixel within an image; a correction amount setting portion setting a correction amount based on an error value determined for at least one adjacent pixel that has been already-processed and that is located near to the subject pixel; a correction amount adjusting portion adjusting the correction amount; a correcting portion correcting the input data by the adjusted correction amount, thereby converting the input data into corrected data; and a converting portion performing a conversion process to convert the corrected data into an output data while calculating an error value obtained through the conversion process for the subject pixel.

In the image processing device according to the present invention described above, the correction amount adjusting portion adjusts the correction amount. Accordingly, it is possible to obtain output data with desired image processing characteristics that can reproduce an image as desired by a user. For example, if the correction amount adjusting portion adjusts the correction amount to the value of zero (0), the output data can reproduce an image equivalent to an image that has been subjected to a dithering process. When the correction amount adjusting portion does not change the correction amount, the device can reproduce an image equivalent to an image that has been subjected to an error diffusion process. Hence, the correction amount adjusting portion can switch between different image processing characteristics using a simple construction to adjust the correction amount.

The converting portion may include: a threshold storing portion storing a preset threshold; a comparing portion comparing the corrected data with the threshold; an outputting portion outputting the output data based on results of the comparison performed by the comparing portion; a relative density setting portion setting a relative density value based on the output data; and an error calculating portion calculating an error value for the subject pixel based on a difference between the corrected data and the relative density value.

The image processing device of the present invention may further comprise: an image characteristic identifying portion receiving input data indicative of all the pixels within the image and identifying characteristics of the image; and a first adjustment characteristic modifying portion modifying the adjustment characteristic of the correction amount adjusting portion based on results of identification by the image characteristic identifying portion.

In the image processing device described above, the image characteristic identifying portion identifies characteristics of the image, and the first adjustment characteristic modifying portion modifies the adjustment characteristic of the correction amount adjusting portion based on the identified characteristics of the image. Therefore, it is possible to obtain desired image processing characteristics in order to easily reproduce images as desired by the user. For example, if the input data is in a light region in which delay of dot output by the error diffusion process can stand out, this delay of dot output can be prevented by correcting the adjustment characteristics so that the correction amount decreases or becomes always zero (0), thereby achieving a process approximating the dithering process.

The image processing device may further comprise: an image recording portion recording an image on a recording medium based on the output data; a setting portion setting an output condition of the output data; a recording characteristic identifying portion identifying recording characteristics of the image recording portion based on the set output conditions; and a second adjustment characteristic modifying portion modifying the adjustment characteristics of the correction amount adjusting portion based on the recording characteristics identified by the recording characteristic identifying portion.

With this construction, it is possible to obtain suitable images based on the recording characteristics of the image recording device. That is, the recording characteristic identifying portion identifies recording characteristics, such as whether the image recording device is performing high-resolution recording, wherein delay of dot output may not stand out, or whether the recording device is using light ink, and the like. For example, when using a recording device that records at a low resolution in which the delay of dot output can stand out, the adjusting characteristics of the correction amount adjusting portion are modified to perform a process similar to the dithering process for preventing delay in dot output, thereby preventing degradation in image quality caused by delay in dot output.

According to another aspect, the present invention provides an image processing, program, comprising: a program of receiving input data indicative of one pixel within an image; a program of setting a correction amount based on an error value determined for at least one adjacent pixel that has been already-processed and that is located near to the subject pixel; a program of adjusting the correction amount; a program of correcting the input data by the adjusted correction amount, thereby converting the input data into corrected data; and a program of performing a conversion process to convert the corrected data into an output data while calculating an error value obtained through the conversion process for the subject pixel.

In this way, the image processing device and the image processing program according to the present invention can attain the above and other objects by adjusting properties of the image process.

BRIEF DESCRIPTION OF THE DRAWINGS

The above and other objects, features and advantages of the invention will become more apparent from reading the following description of the preferred embodiments taken in connection with the accompanying drawings in which:

FIG. 7(A) is an explanatory diagram showing an example of a threshold table ThT used in the multilevel error-diffusion halftone process of the present embodiment;

FIG. 7(B) is an explanatory diagram showing an example of a relative density table RT used in the multilevel error-diffusion halftone process of the present embodiment;

FIG. 7(C) is an explanatory diagram showing an example of a distribution matrix DM used in the multilevel error-diffusion halftone process of the present embodiment;

FIG. 15(B) shows a magnified result of a comparative print sample obtained by a conventional error-diffusion halftone process;

DETAILED DESCRIPTION OF THE PREFERRED EMBODIMENTS

An image processing device according to preferred embodiments of the present invention will be described while referring to the accompanying drawings.

First Embodiment

Figure 1:
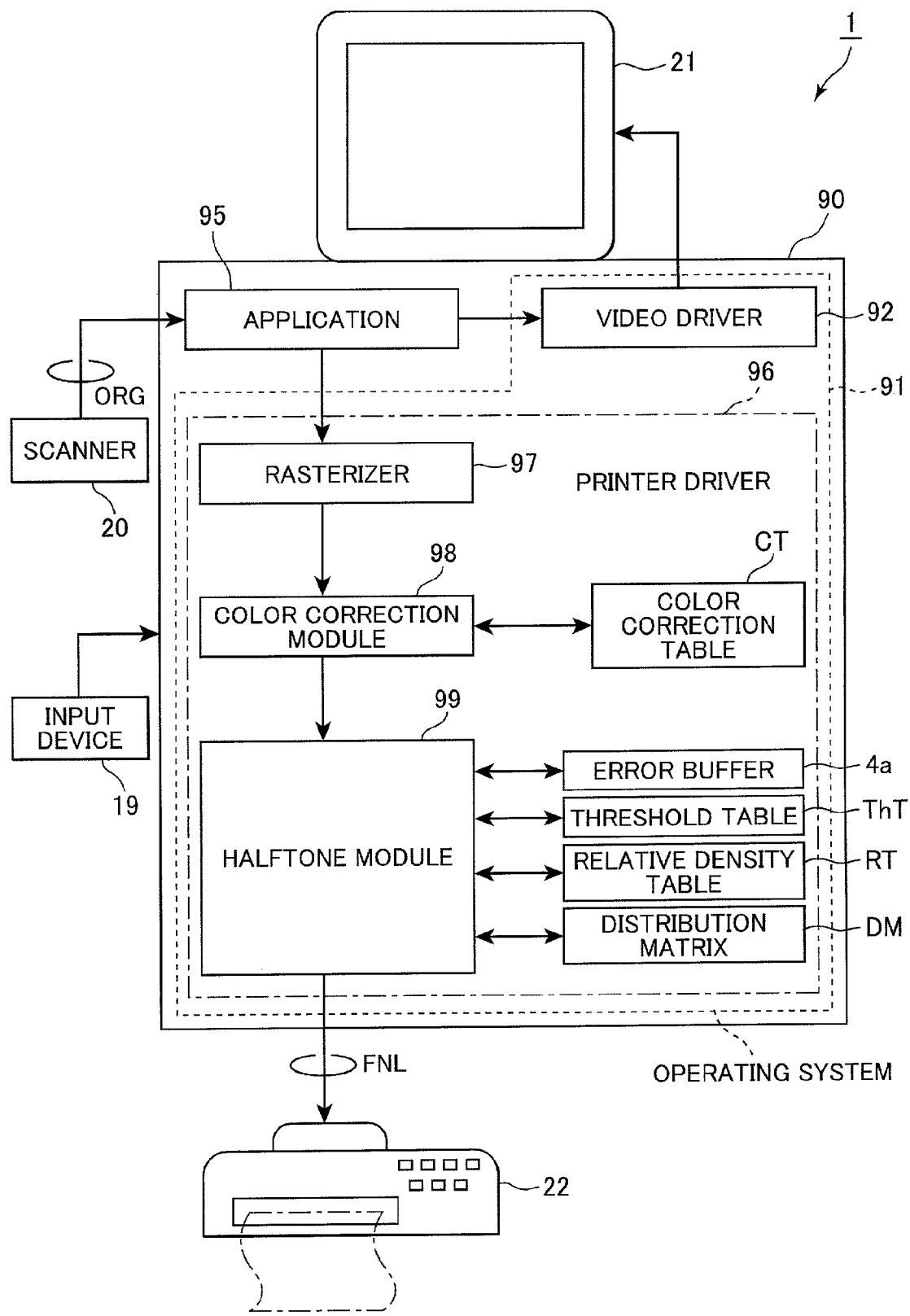
FIG. 1 is a block diagram showing the general configuration of an image processing system employing a personal computer as an image processing device according to a first embodiment of the present invention.

FIG. 1 shows the configuration of an image processing system 1 according to a first embodiment of the present invention. The image processing system 1 is constructed from: a personal computer 90, which is the image processing device of the present embodiment; and a color printer 22 which is an image forming device outputting an image processed by the personal computer 90.

As shown in FIG. 1, the image forming system 1 includes the personal computer 90 and, provided external to the personal computer 90, a scanner 20, the color printer 22, a color display 21, and an input device 19 such as a keyboard, mouse, and the like.

The external scanner 20 reads color image data from an original color print and supplies original color image data ORG to the personal computer 90. The original color image data ORG includes three color components: red (R), green (G), and blue (B).

When desiring to print images, the personal computer 90 generates, based on the original color image data ORG or the like, two-bit CMYKLcLm output data ($C_{out}$, $M_{out}$, $Y_{out}$, $K_{out}$, $Lc_{out}$, $Lm_{out}$) required for printing, and supplies the CMYKLcLm output data as final color image data FNL to the color printer 22 so that the color printer 22 records the image data on a recording paper.

First, the general construction of the printer 22 will be described with reference to FIG. 2.

Figure 2:
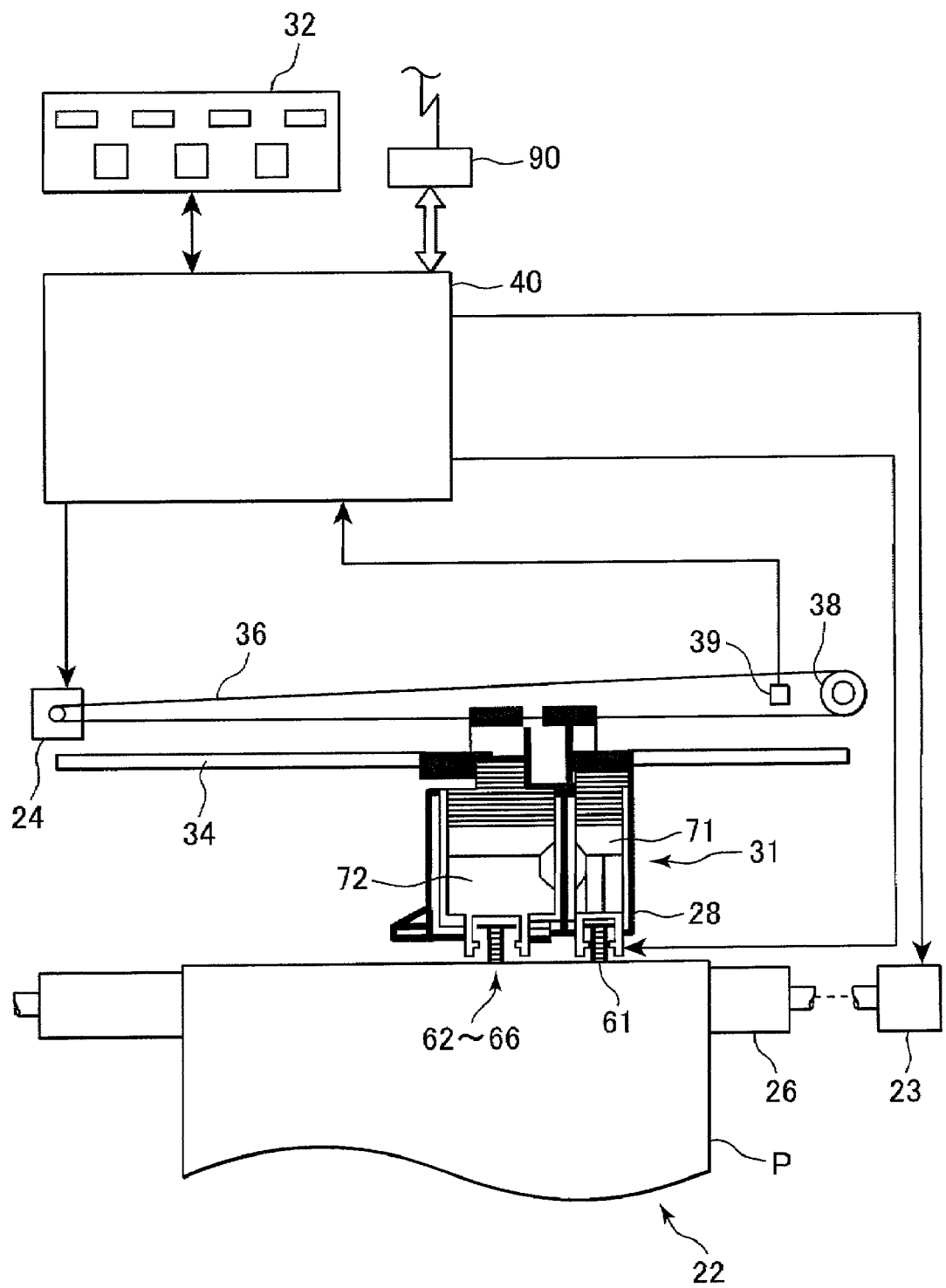
FIG. 2 shows the general construction of a printer provided in the image processing system of FIG. 1.

As shown in FIG. 2, the printer 22 includes: a carriage 31, a platen 26, a carriage motor 24 for is reciprocally moving the carriage 31 along the axial direction of the platen 26, a print head 28 mounted on the carriage 31, a mechanism (not shown) for driving the print head 28 and controlling ink ejection from the print head 28 to form dots, a paper feed motor 23, a control panel 32, and a control circuit 40 for controlling the exchange of signals between the control panel 32 and the paper feed motor 23, carriage motor 24, and print head 28.

Figure 3A:
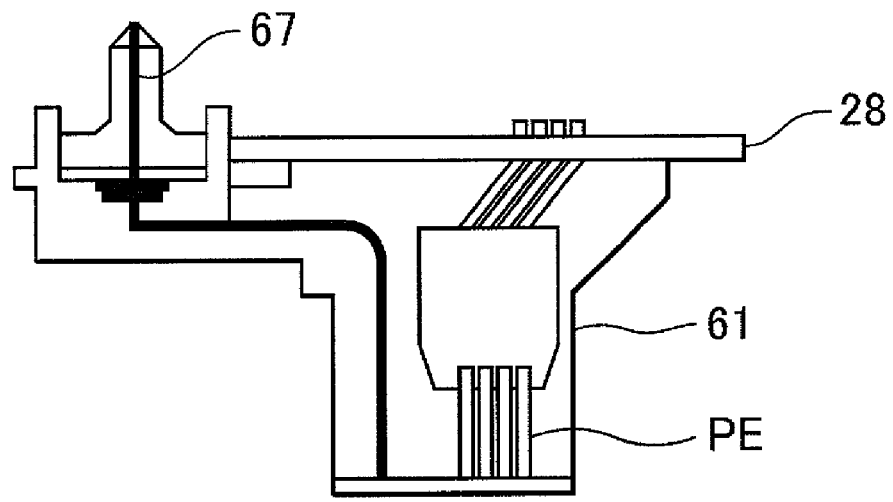
FIG. 3(A) is an explanatory diagram showing the general internal structure of an inkjet print head provided in the printer of FIG. 2.

A black ink cartridge 71 for black ink (K) and a color ink cartridge 72 for storing five ink colors, including normal cyan (C), normal magenta (M), yellow (Y), light cyan (Lc), and light magenta (Lm) are mounted in the carriage 31 of the printer 22. A total of six ink ejection heads 61 through 66 are formed in the print head 28 on the bottom of the carriage 31. As shown in FIG. 3(A), a guiding tube 67 is formed on the bottom of the carriage 31 for guiding ink from each ink tank to the corresponding ink ejection head. When the black ink cartridge 71 and the color ink cartridge 72 are mounted on top of the carriage 31, each guiding tube 67 is inserted through a connecting hole provided in each cartridge, allowing ink to be supplied from each ink cartridge to the ink ejection heads 61 through 66.

Figure 3B:
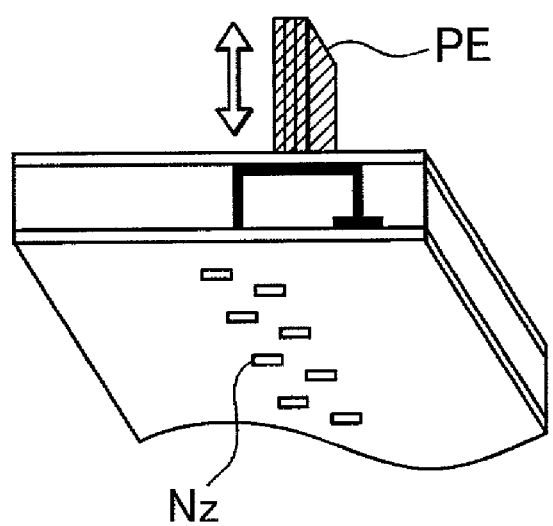
FIG. 3(B) is an explanatory diagram showing nozzles formed on the inkjet print head.

Here, the mechanism for ejecting ink will be briefly described FIGS. 3(A) and 3(B) are explanatory diagrams showing the general internal structure of the print head 28. When the black ink cartridge 71 and the color ink cartridges 72 are mounted on the carriage 31, ink is drawn out of the ink cartridges by the capillary effect, as shown in FIG. 3(A), and introduced into the ink ejection heads 61 through 66 of the print head 28 provided on the bottom of the carriage 31. It is noted that when the ink cartridge is first mounted on the carriage 31, a special pump device performs an operation to draw ink into each of the ink ejection heads 61 through 66.

Figure 4A:
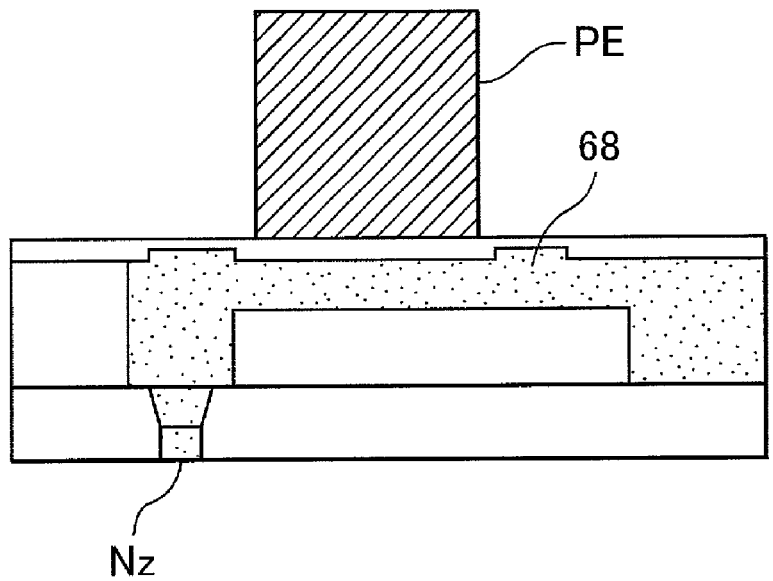
FIG. 4(A) is an explanatory diagram showing the construction of a piezoelectric element PE and a nozzle Nz provided in the inkjet print head of FIG. 3(B)
Figure 4B:
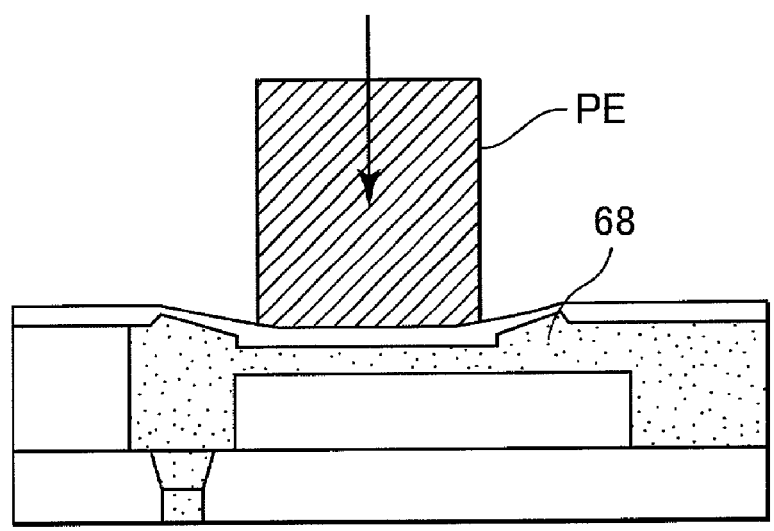
FIG. 4(B) shows how the piezoelectric element PE is actuated to eject an ink particle through the nozzle Nz.

As shown in FIG. 3(B), 32 nozzles Nz are provided on each of the ink ejection heads 61 through 66. Highly responsive piezoelectric elements PE are disposed one on each nozzle as an electrostrictive element FIG. 4(A) shows a detailed configuration of the piezoelectric element PE and the nozzle Nz. As shown in FIG. 4(A), each piezoelectric element PE is disposed adjacent to an ink channel 68 provided for guiding ink to the nozzle Nz. As is well known in the art, the piezoelectric element PE is a device capable of converting electricity to mechanical energy at an extremely high speed wherein a crystalline structure is deformed when a voltage is applied to the element. In the present embodiment, a voltage is applied across electrodes provided on either side of the piezoelectric element PE for a prescribed time interval, causing the element to expand only while the voltage is being applied. The expanded piezoelectric element PE deforms one side wall of the ink channel 68, as shown in FIG. 4(B). As a result, the capacity or volume of the ink channel 68 is constricted by the expansion of the piezoelectric element PE, and ink corresponding to the constricted portion becomes an ink particle Ip and is ejected at a high rate of speed via the end of the nozzle Nz. Printing is achieved by these ink particles Ip to form dots by permeating a paper P mounted on the platen 26.

According to the present embodiment, the piezoelectric element PE attains four levels of gradation for one dot. In order from the level of greatest density, these four levels include large dots, medium dots, small dots, and non-dots. In this example, the piezoelectric element PE is controlled to eject: a small droplet with a droplet amount of 4 pl for a small dot, a medium droplet with a droplet amount of 10 pl for a medium dot, and a large droplet with a droplet amount of 20 pl for a large dot.

With the printer 22 having the hardware construction described above, the carriage motor 24 moves the carriage 31 reciprocally (that is, in the main scanning direction X), while the paper feed motor 23 rotates the platen 26 and other rollers to convey the paper P in the sub scanning direction Y. At the same time, the printer 22 drives the piezoelectric elements PE for each of the ink ejection heads 61 through 66 on the print head 28 to eject each color of ink, forming dots on the paper P that combine to form multicolor images.

The mechanism for conveying the paper P includes a gear train (not shown) for transferring the rotations of the paper feed motor 23 not only to the platen 26, but also to paper conveying rollers. The mechanism for reciprocally moving the carriage 31 includes: a sliding shaft 34 that supports the carriage 31 parallel to the axis of the platen 26 such that the carriage 31 can slide along the sliding shaft 34; a pulley 38 disposed near the opposite end of the sliding shaft 34 from the carriage motor 24; an endless drive belt 36 stretched between the carriage motor 24 and pulley 38; a positional sensor 39 for detecting the origin position of the carriage 31; and the like.

Next, the internal structure of the control circuit 40 will be described.

Figure 5:
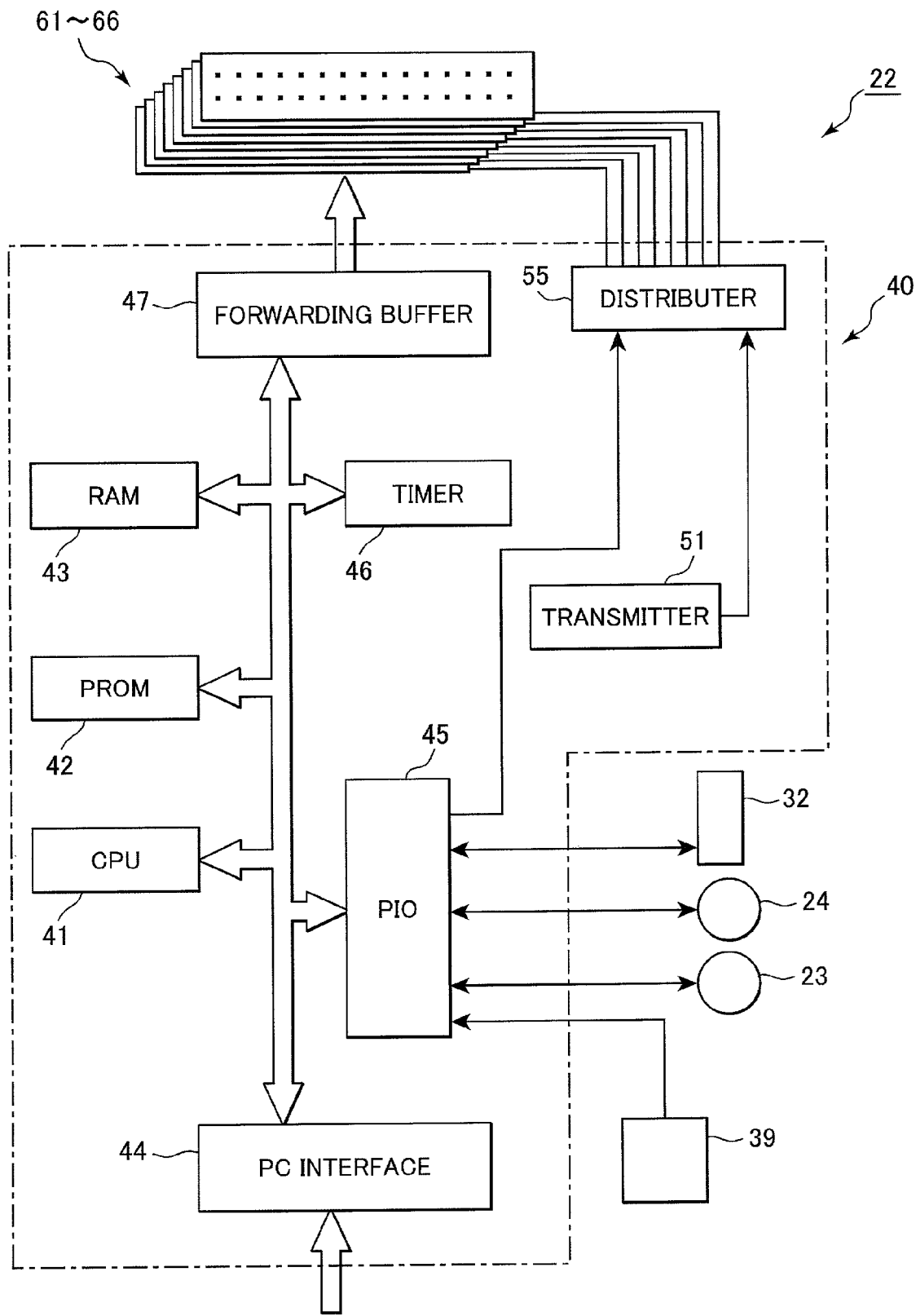
FIG. 5 is a block diagram showing the internal construction of a control circuit in the printer of FIG. 2.

FIG. 5 is an explanatory diagram showing the internal construction of the control circuit 40.

As shown in FIG. 5, the control circuit 40 includes: a CPU 41; a PROM 42; a RAM 43; a computer interface 44 for exchanging data with the personal computer 90; a peripheral I/O unit 45 for exchanging signals with the paper feed motor 23, carriage motor 24, control panel 32, positional sensor 39 and the like; a timer 46; a forwarding buffer 47 for outputting a dot on/off signal (two-bit CMYKLcLm output data) to the ink ejection heads 61 through 66; and the like. The above elements and circuits are connected to one another via a bus. The control circuit 40 also includes a transmitter 51 for outputting driving waves at a prescribed frequency and a distributor 55 for distributing output from the transmitter 51 to the ink ejection heads 61 through 66 at a prescribed timing.

After receiving the two-bit CMYKLcLm output data processed by the personal computer 90, the control circuit 40 stores the two-bit CMYKLcLm output data temporarily in the RAM 43, and subsequently outputs the two-bit CMYKLcLm output data to the forwarding buffer 47 at a prescribed timing.

Next, the personal computer 90, which serves as the image processing device of the present embodiment, will be described.

Figure 6:
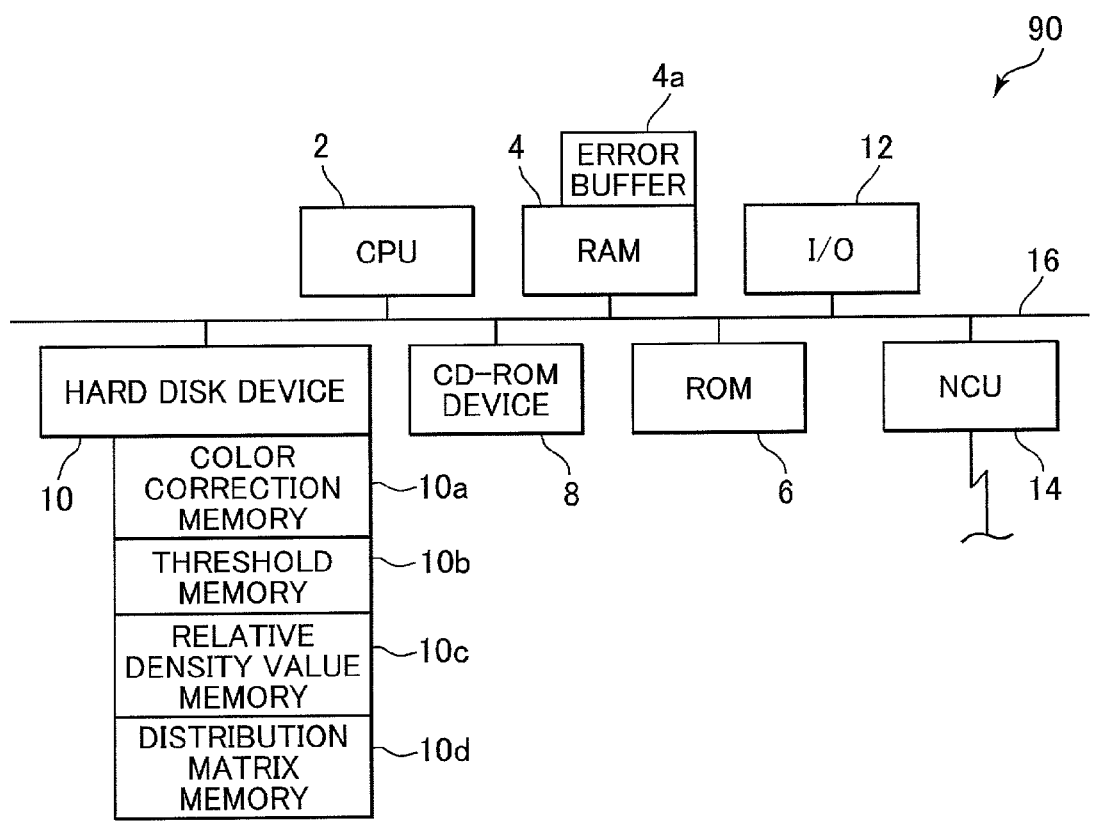
FIG. 6 is a block diagram showing the internal construction of the personal computer of FIG. 1.

As shown in FIG. 6, the personal computer 90 is internally provided with a CPU 2, a RAM 4, a ROM 6, a CD-ROM device 8, a hard disk device 10, an input/output interface (I/O) 12, and a network control unit 14, all of which are connected with one another via a bus 16.

The input/output interface 12 is connected to the scanner 20, the input device 19, the color display 21, and the color printer 22 (FIG. 1).

The network control unit 14 is connected to a predetermined network such as the Internet.

The hard disk device 10 previously stores therein data of an operating system program 91, an application program 95, a video driver program 92, and a printer driver program 96 (FIG. 1). It is noted that the data of the programs 91, 92, 95, and 96 may be stored originally in a CD-ROM and read via the CD-ROM device 8 into the hard disk device 10. Or, the data of the programs 91, 92, 95, and 96 may be transferred from the Internet via the NCU 14 into the hard disk device 10. The hard disk device 10 also stores therein: a color correction memory 10a, a threshold memory 10b, a relative density value memory 10c, and a distribution matrix memory 10d. As will be described later, the color correction memory 10a stores therein a color correction table CT (FIG. 1). The threshold memory 10b stores therein a threshold table ThT (FIG. 7(A)). The relative density value memory 10c stores therein a plurality of relative density tables RT (FIG. 7(B)). The distribution matrix memory 10d stores therein a distribution matrix DM (FIG. 7(C)).

The ROM 6 previously stores therein various data. The ROM 6 may store therein data of the programs 91, 92, 95, and 96, the color correction memory 10a, the threshold memory 10b, the relative density value memory 10c, and the distribution matrix memory 10d.

The RAM 4 is used for temporarily storing various types of data. As will be described later, an error buffer 4a is prepared in the RAM 4.

The CPU 2 is for controlling the entire device of the personal computer 90. The CPU 2 executes the programs 91, 92, 95, and 96, whose data is read into the RAM 4 from the hard disk device 10.

As shown in FIG. 1, the application program 95 operates under the operating system 91. The video driver 92 and the printer driver 96 are integrated with the operating system 91 The application program 95 is used to perform image retouching or the like, and reads an image from the external scanner 20 and displays this image on the color display 21 via the video driver 92 while performing various processes on the image.

When the application program 95 issues a print command, the printer driver 96 receives image data from the application program 95, and converts the image data into two-bit CMYKLcLm signals (final color image data FNL) that can be printed by the printer 22.

As shown in FIG. 1, the printer driver 96 includes: a rasterizer 97, a color correction module 98, and a halftone module 99. The color correction module 98 uses the color correction table CT. The halftone module 99 uses the threshold table ThT, the relative density table RT, and the distribution matrix DM. The halftone module 99 prepares the error buffer 4a in the RAM 4.

The rasterizer 97 is for converting color image data handled by the application program 95 into color component data per dot unit. The color component data is in the form of eight-bit CMYK color data ($C_{color}$, $M_{color}$, $Y_{color}$, $K_{color}$) for cyan, magenta, yellow, and black color components. Each data $C_{color}$, $M_{color}$, $Y_{color}$, or $K_{color}$ has a value in the range of 0 to 255. The color correction module 98 is for performing color correction on the eight-bit CMYK color data ($C_{color}$, $M_{color}$, $Y_{color}$, $K_{color}$) according to the colors and coloring properties of ink used by the printer 22. Because the printer 22 creates images by, using ink of six colors C: cyan, M: magenta, Y: yellow, K: black, Lc: light cyan, and Lm: light magenta, the color correction module 98 converts the eight-bit CMYK color data ($C_{color}$, $M_{color}$, $Y_{color}$, $K_{color}$) into eight-bit CMYKLcLm ink data ($C_{in}$, $M_{in}$, $Y_{in}$, $K_{in}$, $Lc_{in}$, $Lm_{in}$) while referring to the color correction table CT. Each data $C_{in}$, $M_{in}$, $Y_{in}$, $K_{in}$, $Lc_{in}$, or $Lm_{in}$ has a value also in the range of 0 to 255.

The halftone module 99 is for receiving the eight-bit CMYKLcLm ink data ($C_{in}$, $M_{in}$, $Y_{in}$, $K_{in}$, $Lc_{in}$, $Lm_{in}$) as input data Iin, converting the input data Iin into two-bit CMYKLcLm ink data ($C_{in}$, $M_{in}$, $Y_{in}$, $K_{in}$, $Lc_{in}$, $Lm_{in}$), and outputting the resultant two-bit CMYKLcLm ink data ($C_{out}$, $M_{out}$, $Y_{out}$, $K_{out}$, $Lc_{out}$, $Lm_{out}$) as output data Iout to the printer 22. Each output data Iout (=$C_{out}$, $M_{out}$, $Y_{out}$, $K_{out}$, $Lc_{out}$, or $Lm_{out}$) has a multi-level (two-bit) value of 0, 1, 2, or 3. The thus obtained multi-level halftone image data renders density for a certain surface area according to the existence of ink in dot units. As described already, the printer 22 has four levels of gradation per pixel by ejecting a large dot, a medium dot, a small dot, and a non-dot. Accordingly, the halftone module 99 determines four levels of gradation per pixel such that output data Iout with a value of 0 is indicative of "output no dot", output data Iout with a value of 1 is indicative of "output small dot", output data Iout with a value of 2 is indicative of "output medium dot", and output data Iout with a value of 3 is indicative of "output large dot".

In this way, by the CPU 2 executing the halftone module 99, the personal computer 90 serves as an error-diffusion multilevel halftone processor of the present embodiment to convert eight-bit CMYKLcLm input data Iin into two-bit CMYKLcLm output data Iout.

Next will be described in greater detail how the halftone module 99 executes the error-diffusion multilevel halftone process.

As described above, the threshold memory 10b stores therein the threshold table ThT as shown in FIG. 7(A). The threshold table ThT lists up three thresholds Ta, Tb, and Tc (where Ta>Tb>Tc) for each of the six ink colors. The thresholds Ta, Tb, and Tc are used for determining whether or not to form large dots, medium dots, and small dots, respectively.

When a print command is issued from the application program 95, the halftone module 99 retrieves the threshold table ThT from the threshold memory 10b, and sets the threshold table ThT in the RAM 4.

The relative density value memory 10c stores therein a plurality of relative density tables RT. As shown in FIG. 7(B), each relative density table RT lists up relative density values R in correspondence with each of the six ink colors and in correspondence with each of the four dot-gradations.

It is noted that relative density values R for each ink color are defined as indicative of the density ratios of large, medium, small, and non dots relative to the large dot, wherein the density of the large dot is set to the value of 255.

It is further noted that the relative density values R differ according to printing conditions such as ink type, printing medium, resolution, and the like. Hence, the plurality of relative density tables RT are prepared in advance in correspondence with the plurality of different conditions, and are stored in the relative density value memory 10c. When a print command is issued from the application program 95, the halftone module 99 retrieves, from the relative density value memory 10c, one relative density table RT that corresponds to the condition of the present printing operation, and sets the retrieved relative density table RT in the RAM 4.

The distribution matrix memory 10d stores therein a predetermined distribution matrix DM. In this example, the distribution matrix DM is a 3×5 distribution matrix shown in FIG. 7(C). The distribution matrix DM lists up weight coefficients, which are used to distribute, to a pixel that is being presently processed and that is indicated by a mark (*), portions of errors which are obtained at nearby pixels, which are located adjacent to the subject pixel and which have been processed previously.

Figure 8:
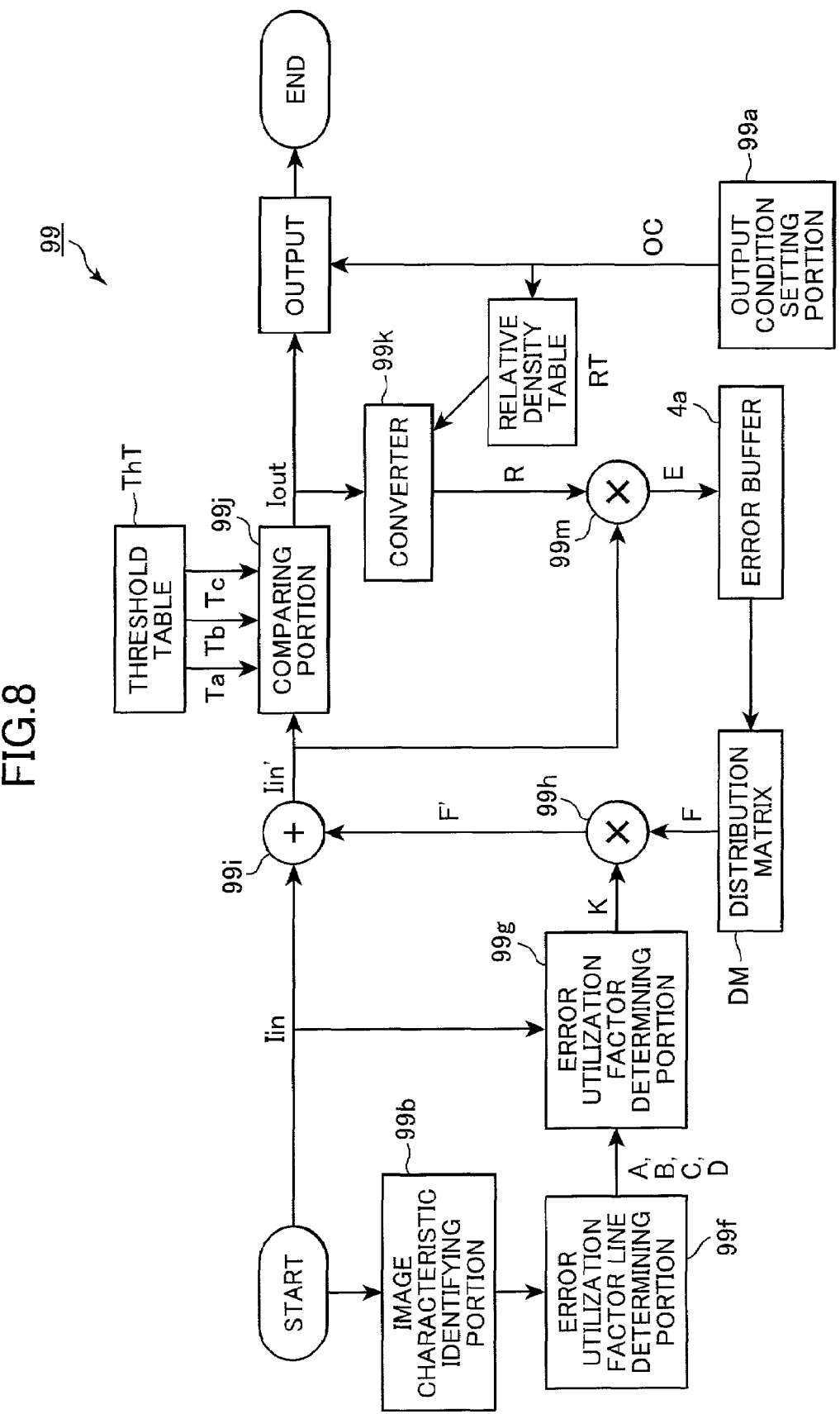
FIG. 8 is a functional block diagram showing the multilevel error-diffusion halftone process according to the first embodiment.

FIG. 8 is a functional block diagram showing an overview of an error-diffusion multilevel halftone process executed by the halftone module 99 for eight-bit input data Iin (=$C_{in}$, $M_{in}$, $Y_{in}$, $K_{in}$, $Lc_{in}$, $Lm_{in}$). it is noted that when the halftone module 99 starts performing the error-diffusion multilevel halftone process for input data Iin indicative of an image to be printed, pixels (x, y) of the image are successively processed from the upper left corner (original position (0, 0)) of the subject image in the main scanning direction X and the sub scanning direction Y.

In the following description, it is assumed that the error-diffusion multilevel halftone process is executed for the successive pixels to convert their eight-bit normal cyan data $C_{in}$ (input value Iin) into two-bit normal cyan data $C_{out}$ (output value Iout).

As shown in FIG. 8, the halftone module 99 includes: an output condition setting portion 99a; an image characteristic identifying portion 99b; an error utilization factor line determining portion 99f; an error utilization factor determining portion 99g; an error utilization factor multiplying portion 99h; an adding portion 99i, a comparing portion 99j, a converting portion 99k, and a subtracting portion 99m.

The output condition setting portion 99a is for setting output conditions OC, such as a recording medium used, printing resolution, ink type, ink droplet volume, and ink colors.

The image characteristic identifying portion 99b is for receiving input data Iin (=$C_{in}$, in this example) indicative of densities of one color (cyan color, in this example) at all the pixels within an input image, and for identifying characteristics of the image for the subject color-component (cyan color-component, in this example).

The error utilization factor line determining portion 99f is for determining characteristic values A, B, C, and D for the subject color (cyan color, in this example) based on the identified image characteristics for the subject color-component. The error utilization factor line determining portion 99f then determines, for the subject color-component, an error utilization factor line as shown in FIG. 10 based on the characteristic values A, B, C, and D.

Figure 10:
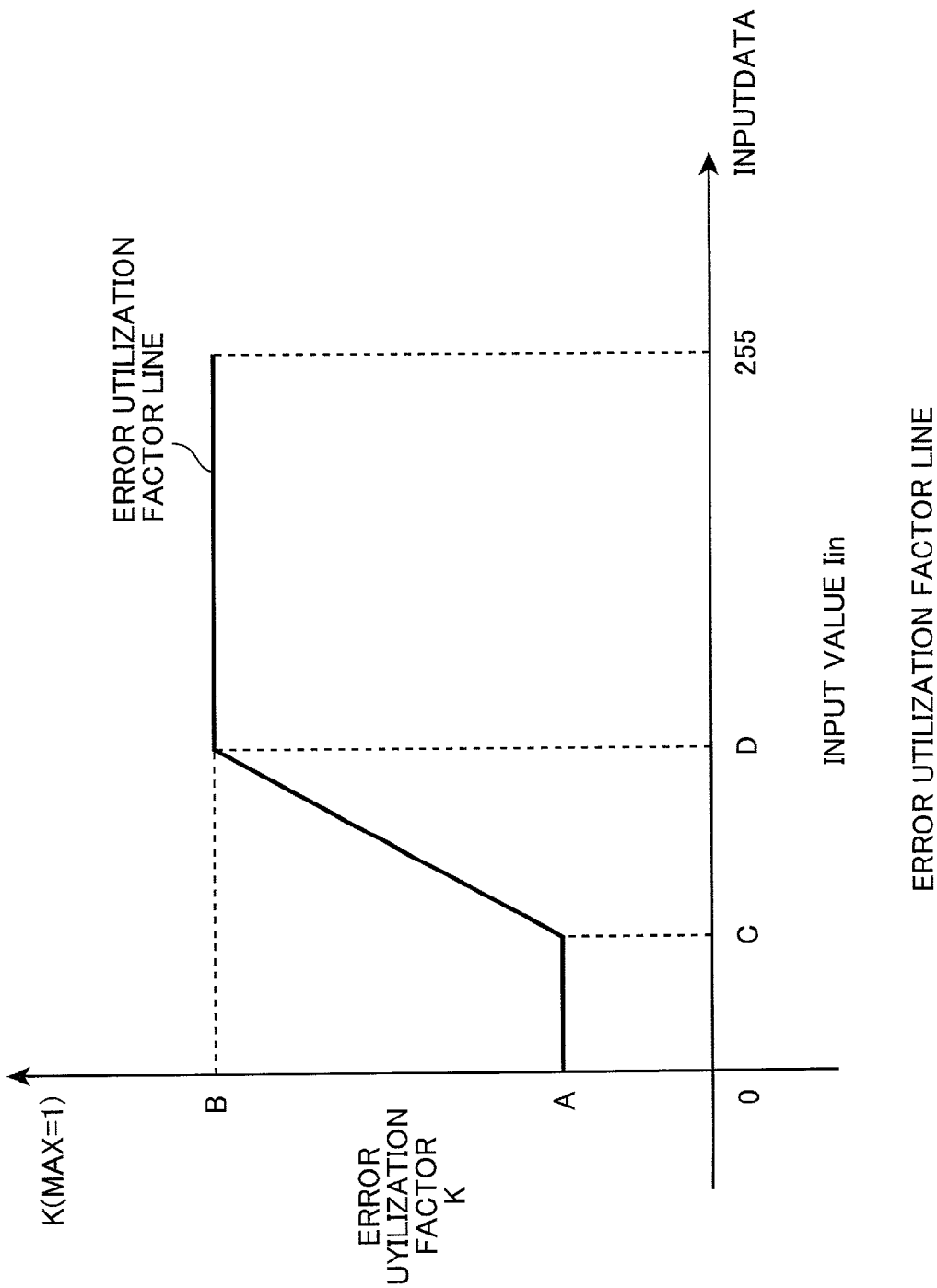
FIG. 10 is a graph showing the error utilization factor line indicative of the relationship between the input value and the error utilization factor.

It is noted that the image characteristic identifying portion 99b and the error utilization factor line determining portion 99f cooperate to execute the operations the same as described above for all the six color components or the image, thereby determining the characteristic values A, B, C, and D for each of all the six color components of the image, and determining the error utilization factor line of FIG. 10 for each of all the six color components of the image. According to the present embodiment, therefore, the error utilization factor line determining portion 99f determines six sets of characteristic values A, B, C, and D representing six error utilization factor lines for all the six color components of a single input image.

After the error utilization factor line determining portion 99f determines the error utilization factor line for the subject image at all the six color-components, the error utilization factor determining portion 99g, the error utilization factor multiplying portion 99h, the adding portion 99i, the comparing portion 99j, the converting portion 99k, and the subtracting portion 99m cooperate to successively process the pixels (x, y) of the subject image for each color-component from its upper left corner (original position (0, 0)) in the main scanning direction X and the sub scanning direction Y.

In order to process an input value Iin (=Cin, for example) for one pixel (x, y) at one color-component (cyan, for example), the error utilization factor determining portion 99g determines an error utilization factor K ($0 \leq K \leq 1$) that is located on the error utilization factor line (FIG. 10) for the corresponding color and that corresponds to the amount of the input value Iin.

The error utilization factor multiplying portion 99h is for calculating a correction amount F, and for multiplying the correction amount F by the error utilization factor K, thereby determining an adjusted correction amount F'. It is noted that the error utilization factor multiplying portion 99h calculates the correction amount F by collecting portions of errors E, which have been obtained at already-processed pixels adjacent to the subject pixel (x, y) for the subject color-component (cyan, in this example) and which have been stored in the error buffer 4a, by using the distribution matrix DM.

The adding portion 99i is for adding the input value Iin with the adjusted correction amount F', thereby converting the input value Iin into a corrected input value Iin'.

The comparing portion 99j is for executing a comparing process to compare the corrected input value Iin', with each of the three thresholds Ta, Tb, and Tc for the subject color, which are retrieved from the threshold memory 10b. The comparing portion 99j determines an output value Iout based on the results of the comparison process. The output value Iout will be outputted to the corresponding recording head (61-66), which in turn performs recording operation in the recording characteristics that correspond to the output conditions OC set by the output condition setting portion 99a.

The converting portion 99k is for setting a relative density value R based on the output value Iout and based on one relative density table RT, which is retrieved from the relative density memory 10c in correspondence with the output conditions OC.

The subtracting portion 99m is for determining an error E for the subject pixel (x, y) by calculating the difference between the corrected input value Iin' and the relative density value R. The error value E calculated for the subject pixel (x, y) is stored in the error buffer 4a.

The error utilization factor determining portion 99g, the error utilization factor multiplying portion 99h, the adding portion 99i, the comparing portion 99j, the converting portion 99k, and the subtracting portion 99m perform the same processes as described above repeatedly until all the pixels of the present image are completely processed for all the color components.

Figure 9:
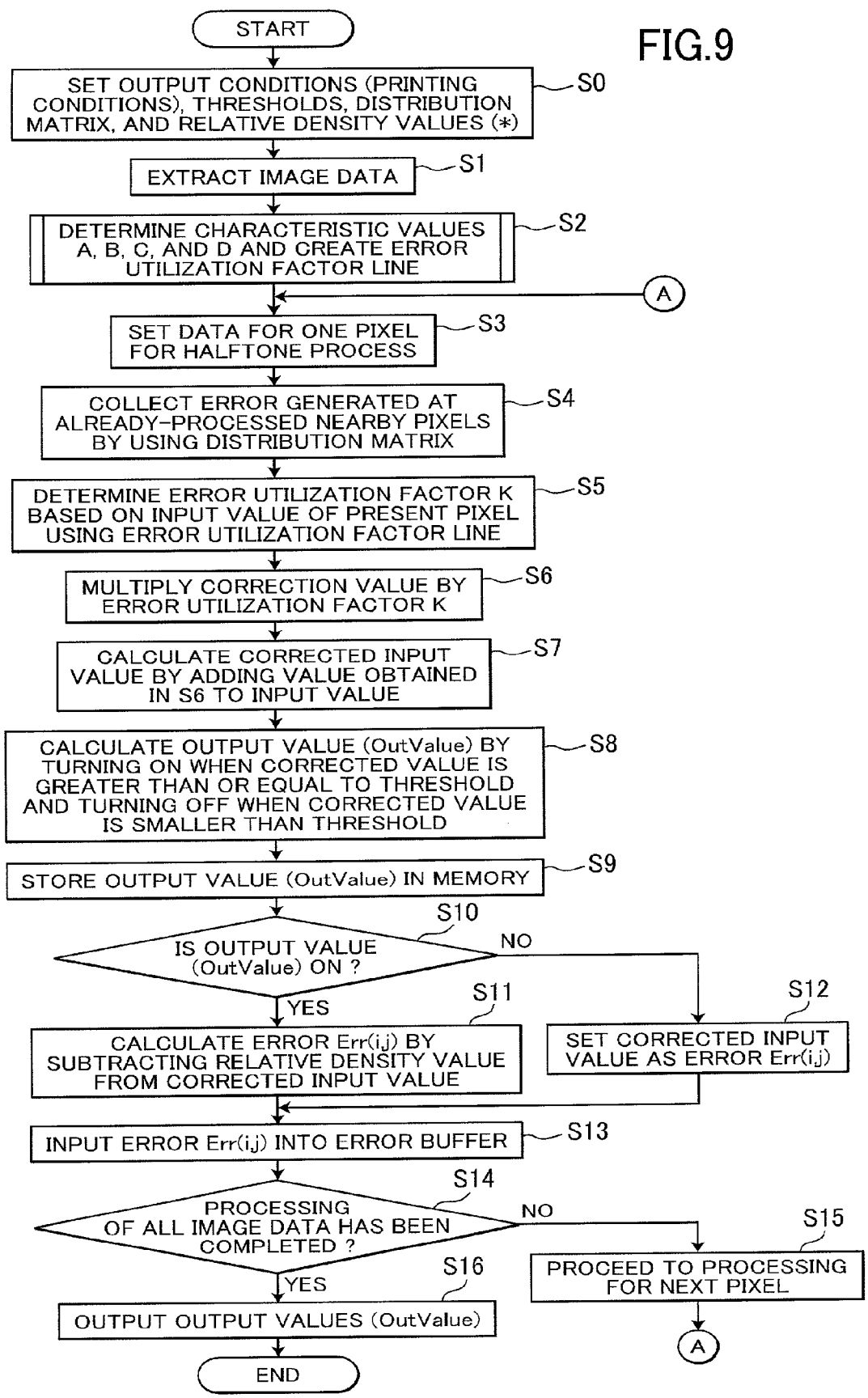
FIG. 9 is a flowchart illustrating the error-diffusion multilevel halftone process according to the first embodiment.

FIG. 9 is a flowchart illustrating in more detail the error diffusion multilevel halftone process of the present embodiment.

When the application program 95 issues a print command, an initialization process is conducted in Step 0 (hereinafter "Steps" is abbreviated to "S"). During the initialization process, output conditions OC for the present printing operation are set in the RAM 4. The output conditions OC include: printing resolution, ink type, printing medium, ink droplet volumes, and ink colors used.

Also in S0, the thresholds Ta, Tb, and Tc (Ta>Tb>Tc) for all the six color components, shown in FIG. 7(A), are retrieved from the threshold memory 10b and are set in the RAM 4. The distribution matrix DM, shown in FIG. 7(C), is retrieved from the distribution matrix memory 10d and is set in the RAM 4. One relative density value table RT shown in FIG. 7(B) is selected among the plurality of relative density value tables RT in the relative density value memory 10c in correspondence with the output conditions OC set. All the relative density values R in the selected relative density value table RT are set in the RAM 4

In S1, CMYKLcLm image data (=Cin, Min, Yin, Kin, Lcin, Lmin) for all the color components at all the pixels within one image is extracted from the color correction module 99 and inputted into the RAM 4.

In S2, characteristic values A, B, C, and D are determined for each color component based on the characteristics of the input image for the corresponding color component. Then, an error utilization factor line is created for each color component, as shown in FIG. 10, based on the characteristic values A, B, C, and D of the corresponding color.

Next, in S3, CMYKLcLm image data (=Cin, Min, Yin, Kin, Lcin, or Lmin) for one color component at one pixel (present pixel (x, y)) in the image is set as an input value Iin.

In S4, errors generated for the same color of the input value Iin at already-processed pixels adjacent to the present pixel (x, y) are read from the error buffer 4a and the portions of the errors are collected as a correction value F by using the distribution matrix DM.

More specifically, the correction value F is calculated by using the following equation (1):

$$\text{"correction value } F" = \tag{1}$$
$$1/48 \times E(x-2, y-2) + 3/48 \times E(x-1, y-2) +$$
$$5/48 \times E(x, y-2) + 3/48 \times E(x+1, y-2) +$$
$$1/48 \times E(x+2, y-2) + 3/48 \times E(x-2, y-1) +$$
$$5/48 \times E(x-1, y-1) + 7/48 \times E(x, y-1) +$$
$$5/48 \times E(x+1, y-1) + 3/48 \times E(x+2, y-1) +$$
$$5/48 \times E(x-2, y) + 7/48 \times E(x-1, y)$$

wherein E(x+i, y+k) is an error obtained at a pixel (x+i, y+k) adjacent to the present pixel (x, y), wherein i is an integer greater than or equal to −2 and smaller than or equal to +2, and k is an integer greater than or equal to −2 and smaller than or equal to zero (0).

In S5, an error utilization factor K corresponding to the present input value Iin is determined based on the error utilization factor line of FIG. 10 for the corresponding color. It is noted that the error utilization factor line is indicative of the relationship between the input value and the error utilization factor K. Hence, one value of error utilization factor K is determined in correspondence with the input value Iin.

Next, in S6, an adjusted correction value F' is determined by multiplying the correction value F by the value of the error utilization factor K.

In S7, a corrected input value Iin' is determined by adding the adjusted correction value F' to the subject input value Iin.

In S8, the corrected input value Iin' is compared with the three thresholds Ta, Tb, and Tc (Ta>Tb>Tc), which have been set in S0 for the color of the input value Iin. When the corrected value Iin' is greater than the threshold Ta, the value 3 is outputted as an output value Iout indicative of "output large dot". When the corrected value Iin' is greater than threshold Tb but smaller than threshold Ta, the value 2 is outputted as an output value Iout indicative of "output medium dot". When the corrected value Iin' is greater than threshold Tc but smaller than threshold Tb, the value 1 is outputted as an output value Iout indicative of "output small dot". When the corrected value Iin' is smaller than threshold Tc, the value 0 is outputted as an output value Iout indicative of "output no dot".

In S9, the output value Iout is stored in the RAM 4. Also in S9, a relative density value R is extracted from the relative value table RT based on the output value Iout and on the color of the input value Iin. For example, when the output value Iout is 1 (small dot) and its process color is cyan, the value 60 is extracted as a relative density value R from the relative value table RT (FIG. 7(B)).

When the output value Iout is ON (Yes in S10), an error is calculated by subtracting the relative density value R from the corrected input value Iin' in S11. On the other hand, when the output value Iout is OFF (No in S10), the corrected input value Iin' is set as the error in S12.

In S13, the calculated error E is inputted into the error buffer 4a.

In S14, it is determined whether or not image data for all the image data, which has been inputted in S1, is processed. If the processing is not complete for all the image data (No in S14), the program proceeds to the next pixel in S15, and the process from S3 is repeated for the next pixel It is noted that when pixels (x, y) on one line of the image are completely processed from left to right for one color component, pixels on the same line are processed again for the next color component. In this way, pixels on each line are processed for all the six color components in succession. When pixels on one line are processed for all the six color components, pixels on the next line are started being processed.

On the other hand, if all the image data has been processed completely (yes in S14), the output values Iout stored in the RAM 4 are outputted to the printer 22 in S16.

The characteristic value determining process of S2 will be described below in greater detail.

It is noted that in S2, six sets of characteristic values (A, B, C, D)) are determined for all the six color components, respectively. The six sets of characteristic values (A, B, C, D) are determined in the same manner with one another. The following description will be given for the case where one set of characteristic values (A, B, C, D) is determined for cyan color component.

During the process of S2, first, an identification process is executed to identify the characteristics of the image for one color-component (cyan color, in this example). Then, the characteristic values A, B, C, and D are set for the subject color component (cyan color, in this example) based on the results of the identification. The error utilization factor line of FIG. 10 is then created for the subject color component based on the characteristic values A, B, C, and D. Data of the error utilization factor line for the subject color component is stored in the RAM 4. Then, the process of S2 is ended, and the program proceeds to S3.

Figure 11:
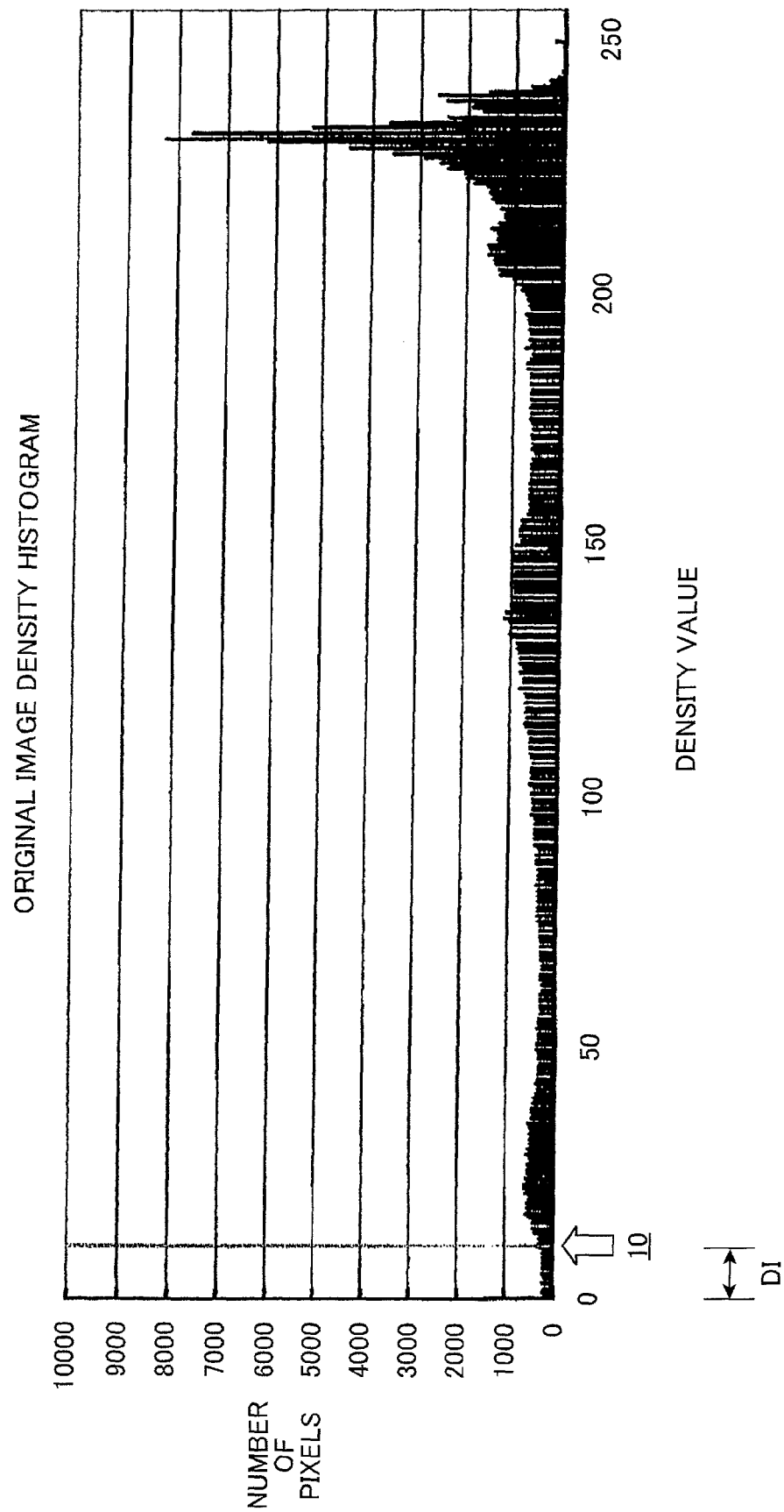
FIG. 11 is a density histogram created based on the input image according to the first embodiment.

It is noted that according to the present embodiment, in order to identify, the characteristics of the image for one color-component (cyan, in this example), density values Iin (=Cin, in this example) at all the pixels in the image are first extracted from the RAM 4. Then, a density histogram is created, for the subject color-component (cyan, in this example), as shown in FIG. 11, by counting the number of pixels that have the same density values Iin (=Cin, in this example). In the graph of FIG. 11, the horizontal axis represents the density value, and the vertical axis denotes the number of pixels. The smaller density values represent lighter colors, while larger density values represent darker colors.

It is noted that false contours will be highly possibly generated in a highlighted region through the error-diffusion halftone process. The highlighted region is defined as a region that appears bright because the number of dots created within the highlighted region is small. Accordingly, the range of the density values in the highlighted region is defined as a density interval, in which false contours are expected to occur. This interval will be referred to as an "estimated false contour occurring density interval DI" hereinafter.

According to the present embodiment, therefore, after creating the density histogram of FIG. 11, the following calculation operations are executed.

That is, the following equation (2) is first used to calculate the value "thre_max" indicative of the maximum density value within the estimated false contour occurring density interval DI:

$$\text{"thre\_max"} = \text{"Value\_min"} \times 0.1 \quad (2)$$

wherein "Value_min" is the minimum value (i.e., value for small dot) among the relative density values R for the subject color (cyan color, in this example) in the relative density table RT. In this example, the relative value table RT has relative densities as shown in FIG. 7(B). Therefore, in this example (for cyan color), "Value_min"0 is set to "60".

In this way, the estimated false contour occurring density interval DI is defined as an interval between the density value (0) and the density value "thre_max".

Next, the following equation (3) is used to calculate the appearance ratio (proportion) P of pixels in the estimated false contour occurring density interval DI:

$$P = \text{"Light\_den"} / \text{"image\_size"} \quad (3)$$

wherein "Light_den" is the total number of pixels within the estimated false contour occurring density interval DI, while "image_size" is the total number of pixels in the inputted image.

In this way, the appearance ratio (proportion) P of pixels in the estimated false contour occurring density interval DI is determined as the image characteristics of the input image.

Then, characteristic values A, B, C, and D are determined using the following equations (4)-(7):

$$A = 1 - P \quad (4)$$

$$B = 1 \quad (5)$$

$$C = \text{"thre\_max"} \quad (6)$$

$$D = \text{"thre\_max"} \times 2.0 \quad (7)$$

The thus determined characteristic values A, B, C, and D define the error utilization factor line, as shown in FIG. 10, for the subject color component (cyan, in this example).

The above-described histogram-creating and calculating operations are executed repeatedly for all the six color components of the input image in the same manner as described above, thereby determining six sets of characteristic values (A, B, C, D) for all the six color components of the input image.

As apparent from the equation (4), as the proportion P of the highlighted sections in the entire image increases, the magnitude A decreases. Accordingly, even when the proportion P of the highlighted sections in the entire image increases and the possibility that the false contours will be generated increases, it is possible to reduce the effects from errors distributed from already-processed pixels by decreasing the magnitude A. It is therefore possible to prevent occurrence of false contours. In this way, false contours can be prevented from occurring by changing the characteristic values A, B, C, and D according to the proportion P of the highlighted sections in the entire image.

It is noted that the density values of the highlighted sections are approximately in a range of 0 to 10 (thre_max), but are changeable according to printing conditions, such as a kind of printing media, a kind of ink, and resolution, and the like. According to the present embodiment, therefore, the plurality of different relative density tables RT are prepared beforehand in correspondence with the plurality of different printing conditions, and are stored in the relative density memory 10c. One of the relative density tables RT is extracted and set in S0 in correspondence with the present outputting condition OC. The value of "Value_min" is retrieved from the extracted relative density table RT, and the value "thre_max" is determined based on the value "Value_min" by using the equation (2). In this way, the density range of 0 to "thre_max" of the highlighted sections can be determined properly dependently on the printing conditions.

In order to validate the above-described equations (2)-(7), the present inventors conducted an experiment with using the following conditions:

Input image data = 209,920 pixels (512 H × 410 V)

Minimum relative density = 100

Value_min = 100 thre_max = Value_min × 0.1
    = 100 × 0.1
    = 10

Light_den = 3,797 image_size = 209,920

P = Light_den / image_size
    = 3,797 / 209,920
    = 0.02

A = 1 − 0.02
    = 0.98

B = 1

C = thre_max = 10

D = thre_max × 2.0
    = 10 × 2.0
    = 20

It is noted that during this experiment, a relative density table RT other than that show in FIG. 7(B) was used dependently on the outputting conditions OC, and therefore, the value "Value_min" was set to 100.

The proportion P of highlighted sections in the image used during this experiment was relatively low. Accordingly, the magnitude A was set to a relatively large value that is near to one (1). As shown in the error utilization factor line of FIG. 10, if the inputted input data Iin is in a highlighted region (estimated false contour occurring density interval DI (the range of 0-C, in this example)), the error utilization factor K for the input data Iin will be equal to A. In such a highlighted region, delay of dot output by the error diffusion process can occur. However, because the proportion of the highlighted region is very small, the delay of dot output will not stand out. Because the magnitude A is set to a relatively large value that is equal to or near to one (1), the correction amount F will be multiplied by the value A (=K) into the adjusted correction amount F' that is equal to or nearly equal to the original correction amount F, thereby achieving a process approximating the error diffusion process. Accordingly, errors distributed from already-processed pixels were largely affected onto the input value Iin of the pixel presently being processed. It was possible to attain high quality output of the image having the error diffusion effect.

On the other hand, if the proportion P of highlighted sections in the image is relatively high, the magnitude A will be set to a relatively small value that is equal to or near to zero (0). As shown in the error utilization factor line of FIG. 10, if the input data Iin is in a highlighted region (estimated false contour occurring density interval DI (the range of 0-C, in this example)), the error utilization factor K for the input data Iin will be equal to A. In such a highlighted region, delay of dot output by the error diffusion process can occur and stand out. If the proportion of the highlighted region is very large, the delay of dot output will stand out clearly. However, by setting the magnitude A to a relatively small value that is equal to or near to zero (0), this delay of dot output can be prevented by multiplying the correction amount F by the value A (=K) into the adjusted correction amount F' that is equal to 0 or is much smaller than the original correction amount F, thereby achieving a process approximating the dithering process.

As described above, according to the present embodiment, image characteristics (density histogram, in this example) are first determined dependently on the image data for all the pixels that is extracted from the color correction module 99. Then, characteristic values A, B, C, and D are determined to define the error utilization factor line of FIG. 10. This method is particularly effective when the input image is a natural image.

It is noted that because the density is one of the conditions for generating false contours in error diffusion. Hence, by changing the characteristic values A, B, C, and D in various ways dependently on the density, it is possible to prevent occurrence of false contours in such an area that have many pixels having specified densities. The above-described equations (2)-(7) can be modified in various ways so as to change the characteristic values A, B, C, and D dependently on the density.

<Modification>

Next will be described a modification of the first embodiment with reference to FIG. 12.

The characteristic value determining process of S2 (FIG. 9) according to the present modification will be described below.

Also in this modification, six sets of characteristic values (A, B, C, D) are determined for all the six color components, respectively. The six sets of characteristic values (A, B, C, D) are determined in the same manner with one another. The following description will therefore be given for the case where one set of characteristic values (A, B, C, D) is determined for cyan color component.

According to the present modification, during the process of S2, a density gradient is first determined for one color component (cyan color component, in this example) at each pixel of the input image. Then, the characteristic values A, B, C, and D are determined for the subject color component based on the density gradient. The method of this modification is particularly effective for images having gradation.

It is noted that when an input image is subjected to the error-diffusion process, false contours will highly possibly occur, if the input image has a gradation area where the density value gradually decreases in the Y direction (sub scanning direction (sheet conveying direction)). The present modification is for preventing the occurrence of such a false contour.

According to the present modification, therefore, during the process of S2 (FIG. 9), density values Iin (=Cin, in this example) at all the pixels are first extracted from the RAM 4.

Next, the following equation (8) is used to compute a density gradient of the input image Iin (x, y) (=Cin (x, y), in this example) at each pixel (x, y).

$$\nabla I\text{in} = (\partial I\text{in}/\partial x, \partial I\text{in}/\partial y) \quad (8)$$

Figure 12:
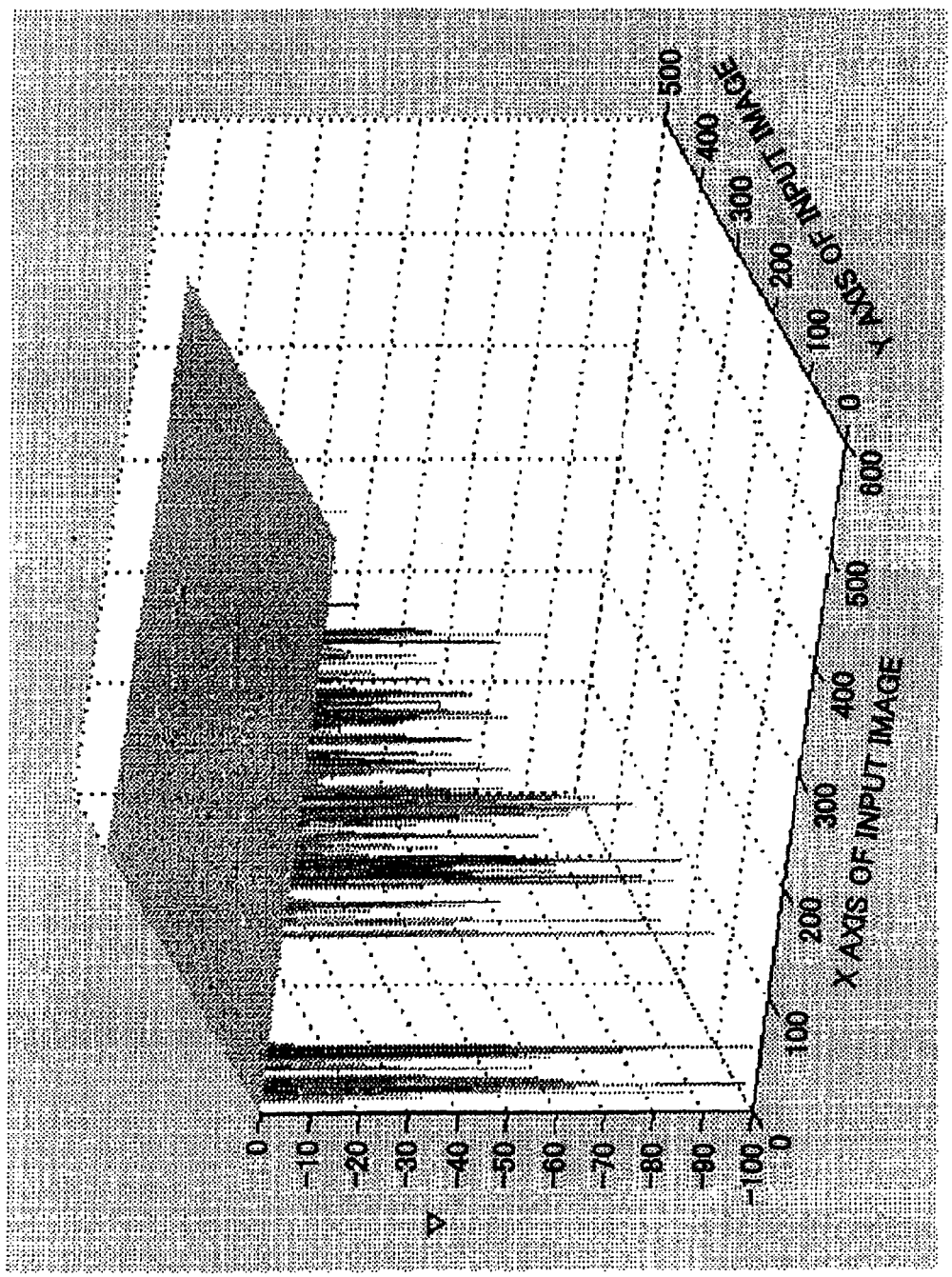
FIG. 12 is a graph showing the results of calculating the density gradient according to a modification of the first embodiment.

Next, from the results of the above-described partial differential equation (8), pixels having its density Iin (Cin, in this example) within the estimated false contour occurring density interval DI (0-thre_max) and having a gradient ∇Iin (∇Cin, in this example) in the negative sign in the direction of the Y axis (sheet conveying direction Y) are plotted as shown in a graph of FIG. 12. Therefore, the graph is plotted with those pixels that have their densities Iin within the interval DI and that have their Y-direction gradients ∂Iin/∂y smaller than zero (0). It is noted that in FIG. 12, the X- and Y-axes denote the x and y coordinates, respectively, of the pixels in the input image, while the Z-axis represents the density gradient at each pixel. In this way, distribution of pixels, whose densities are located in highlighted sections and whose densities have negative or minus gradients in the sheet conveying direction Y, is determined for the subject color-component (cyan color, in this example).

Next, the above-described equation (2) is used to calculate the maximum density "thre_max" for the estimated false contour occurring density interval DI in the same manner as in the first embodiment.

Then, the following equation (9) is used to calculate an appearance ratio (proportion) P' of pixels that have density gradient of negative sign in the Y direction (that is, Y-directional gradient a ∂Iin/∂y smaller than zero (0)) and that is located in the estimated false contour occurring density interval DI (0-thre_max).

$$P' = \text{"gra\_den"}/\text{"image\_size"} \quad (9)$$

wherein "gra_den" is the total number of pixels that have a Y-direction gradient with a negative sign (Y-directional gradient a ∂Iin/∂y smaller than zero (0)) and that have density values within the estimated false contour occurring density interval DI (0-thre_max).

In this way, the appearance ratio (proportion) P' of pixels that have Y-direction gradients of negative sign and that have highlighted or light densities is determined as the image characteristics of the input image for the subject color component (cyan color, in this example).

Then, characteristic values A, B, C, and D are calculated using the following equations (10)-(13):

$$A = 1 - P' \quad (10)$$

$$B = 1 \quad (11)$$

$$C = \text{"thre\_max"} \quad (12)$$

$$D = \text{"thre\_max"} \times 2.0 \quad (13)$$

The thus determined characteristic values A, B, C, and D define the error utilization factor line as shown in FIG. 10.

The above-described gradient-plotting and calculating operations are repeatedly executed for all the six colors of the input image in the same manner as described above, thereby determining six sets of characteristic values (A, B, C, D) for all the six color components of the input image.

As apparent from the equations (12) and (13), C and D are determined by the estimated false contour occurring density interval DI only. Contrarily, as apparent from the equation (10), the characteristic value A changes dependently on the appearance ratio P' of pixels that have Y-direction gradients of negative sign and that have highlighted densities. As the proportion P' of the highlighted negative-gradient sections in the entire image increases, the magnitude A decreases. Accordingly, even when the proportion P' of the highlighted negative-gradient sections in the entire image increases and the possibility that the false contours will be generated increases, decreasing the magnitude A can reduce the effects from errors distributed from already-processed pixels. It is possible to realize a high quality gradation.

In this way, according to the present modification, it is possible to prevent occurrence of false contours in highlighted negative-gradient sections that have a large number of pixels having y-axis density gradient in negative sign.

In order to validate the above-described equations (8)-(13), the present inventors conducted another experiment by using the following conditions:

$$\text{Input image data} = 209{,}920 \text{ pixels } (512 \text{ H} \times 410 \text{ V})$$

$$\text{Minimum relative density} = 100$$

$$\text{Value\_min} = 100$$

$$\text{thre\_max} = \text{Value\_min} \times 0.1$$
$$= 100 \times 0.1$$
$$= 10$$

$$\text{gra\_den} = 1{,}395$$

$$\text{image\_size} = 209{,}920$$

$$P' = \text{Light\_den}/\text{image\_size}$$
$$= 1{,}395 / 209{,}920$$
$$= 0.01$$

$$A = 1 - 0.01$$
$$= 0.99$$

$$B = 1$$

$$C = \text{thre\_max}$$
$$= 10$$

$$D = \text{thre\_max} \times 2$$
$$= 10 \times 2$$
$$= 20$$

The proportion P' of the highlighted negative-gradient sections in the image used during this experiment was relatively low. Accordingly, the magnitude A was set to a relatively large value near to one (1). Errors distributed from already-processed pixels were largely affected onto the input value Iin. It is possible to reproduce the gradation of the image in high quality.

It is noted that because the density gradient is one of the conditions for generating false contours in error diffusion. Hence, by changing the characteristic values A, B, C, and D in various ways dependently on the density gradient, it is possible to prevent occurrence of false contours in such an, area that have many pixels having specified density gradients. The above-described equations (2) and (8)-(13) can be modified in various ways so as to change the characteristic values A, B, C, and D dependently on the density gradient.

Second Embodiment

Next will be described a second embodiment of the present invention with reference to FIGS. 9, 13, 14, 15(A), and 15(B).

Figure 13:
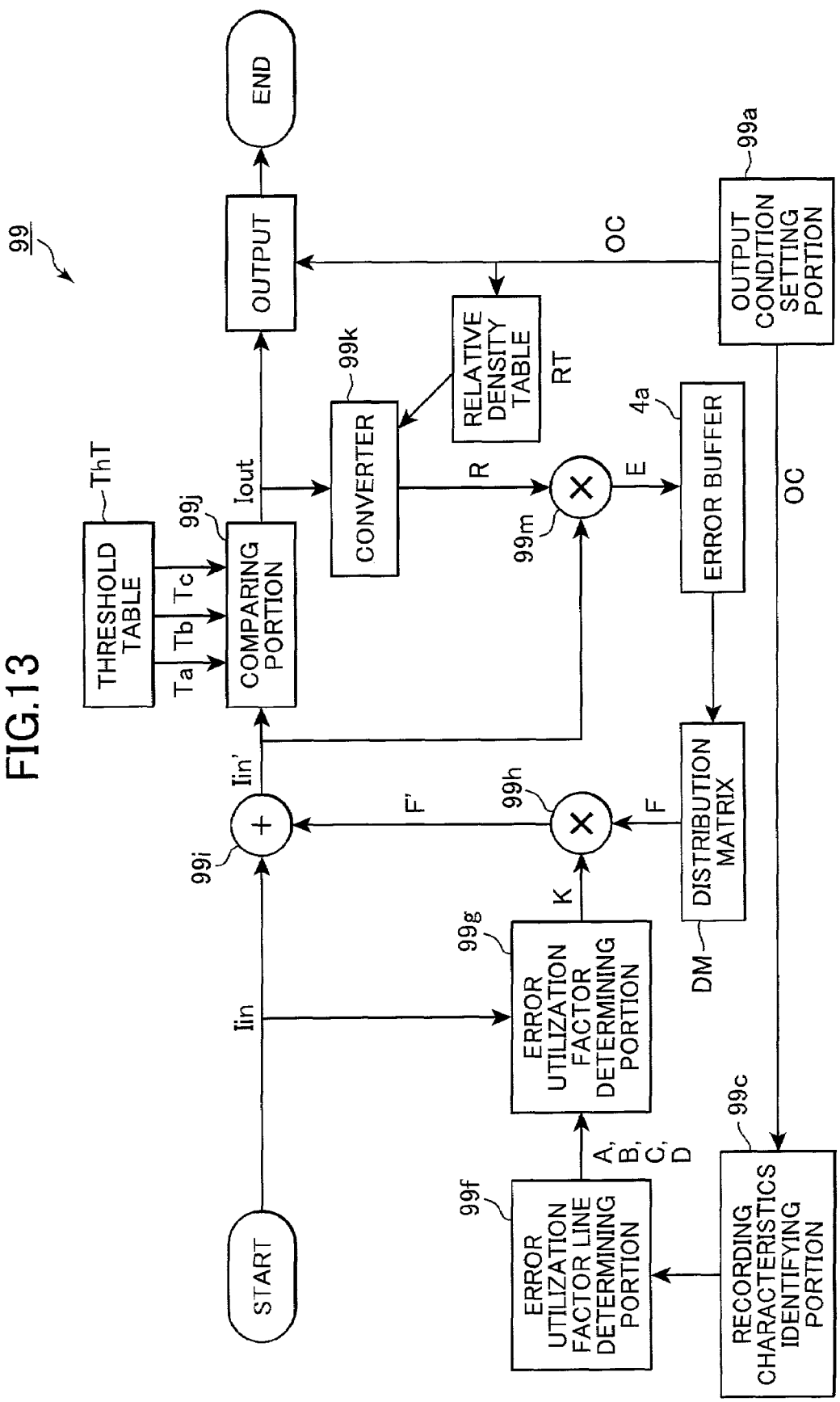
FIG. 13 is a functional block diagram showing the multilevel error-diffusion halftone process according to a second embodiment.

As shown in FIG. 13, according to the present embodiment, the halftone module 99 is not provided with the image characteristic identifying portion 99b, but is provided with a recording characteristic identifying portion 99c. The recording characteristic identifying portion 99c is for identifying recording characteristics of the printer 22 based on the output conditions OC set by the output condition setting portion 99a. The error utilization factor line determining portion 99f determines characteristic values A, B, C, and D for each color component based on the identified recording characteristics.

Similarly to the first embodiment, the recording characteristic identifying portion 99c and the error utilization factor line determining portion 99f cooperate to determine the characteristic values A, B, C, and D and the error utilization factor line of FIG. 10 for each of all the six color components of the image The error utilization factor line determining portion 99f therefore determines six sets of characteristic values A, B, C, and D representing six error utilization factor lines for all the six color-component printing operations for a single input image.

In this example, the recording characteristic identifying portion 99c identifies, as the recording characteristics, the kind of paper used in the present printing operation. The error utilization factor line determining portion 99f determines characteristic values A, B, C, and D for each color component based on the kind of paper used.

Figure 14:
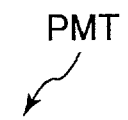
FIG. 14 is an explanatory diagram showing an example of a printing medium-characteristic value table PMT used in the multilevel error-diffusion halftone process of the second embodiment.

According to the present embodiment, the hard disk device 10 previously stores therein a printing medium-characteristic value table PMT shown in FIG. 14. The printing medium-characteristic value table PMT lists up the characteristic values A, B, C, and D for each of several kinds of printing medium (glossy paper and recycled paper, in this example).

It is noted that humans have different perceptions of image-forming dots on different printing media. Accordingly, characteristic values A, B, C, and D are determined beforehand as differing according to the type of printing media as shown in FIG. 14, and are stored in the hard disk device 10.

The characteristic value determining process of S2 (FIG. 9) according to the present embodiment will be described below.

According to the present embodiment, during the process of S2, recording characteristics of the printer 22 are first identified based on the output conditions OC that have been set in S0 (FIG. 9). In this example, the kind of paper used in the printer 22 is identified. Then, the characteristic values A, B, C, and D are determined based on the identified recording characteristics. More specifically, in S2, it is judged whether the present printing operation is to be conducted with using a glossy paper or a recycled paper, while examining the output conditions CO set in S0. If a glossy paper is used in the printer 22, characteristic values A, B, C, and D are set to 0.5, 1, 20, and 30, while referring to the printing medium-characteristic value table PMT. On the other hand, if a recycled paper is used, the characteristic values A, B, C, and D are set to 0.9, 1, 20, and 30.

The above-described judging and characteristic-value selecting operations are executed for each of all the six colors of the input image, thereby determining six sets of characteristic values (A, B, C, D) for the six color components of the input image.

By setting the characteristic values A, B, C, and D according to the kind of the used paper in this manner, it is possible to improve the quality of the image by increasing the error diffusion effects for a type of printing media (recycled paper, in this example), on which dot particles are not easily perceived, and by increasing dithering effects in highlighted regions for the other type of printing media (glossy paper, in this example), on which dot particles are easily perceived and false contours stand out.

Figure 15A:
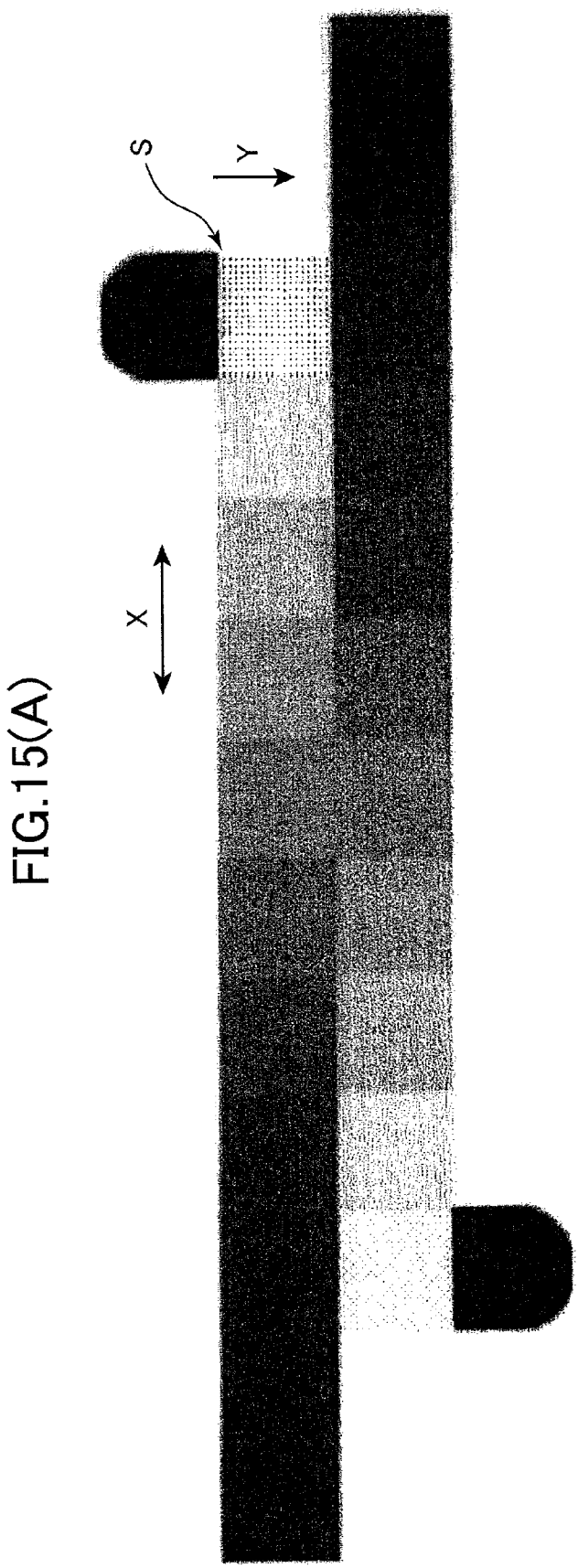
FIG. 15(A) shows a magnified result of a print sample obtained by the halftone process of the second embodiment.

FIG. 15(A) shows a magnified result of a cyan print sample obtained by the halftone process of the present embodiment, in which the characteristic values A, B, C, D were set to 0.5, 1, 20, and 30 according to the printing medium used (a glossy paper, in this example). The correction amount F was adjusted by the error utilization factor X before being distributed to a presently-processed pixel. FIG. 15(B) shows a magnified result of a comparative cyan print sample obtained by a conventional error-diffusion halftone process, in which the correction amount F was completely distributed to a presently-processed pixel. In both of the print samples, two rows of square-shaped portions were arranged in the sub scanning direction Y. In each row, a plurality of square-shaped portions with gradually-changing densities were arranged in the main scanning direction X.

According to the conventional error-diffusion halftone process, as apparent from FIG. 15(B), delay of dots occurred in the lowest density portion (highlighted section) S in the sub scanning direction Y. Therefore, the lowest density portion S did not appear as a square shape. Additionally, in the lowest density portion S, dots were connected with one another in a chain shape in the main scanning direction X, thereby forming false contours.

Contrarily, according to the present embodiment, as apparent from FIG. 15(A), dot delay did not occur in the lowest density portion (highlighted section) S. Dots were arranged accurately in a lattice shape in the lowest density portion S. Accordingly, the lowest density portion S appeared accurately as a square shape. Additionally, dots were arranged in a quasi-regular fashion which is resembled to a printed result obtained by the dithering process. No false contours were occurred in the lowest density portion S. It is also confirmed that no defects were occurred in higher density portions.

First Modification of Second Embodiment

A first modification of the present embodiment will be described with reference to FIGS. 9, 13, and 16(A).

In this modification, the recording characteristic identifying portion 99c identifies, as the recording characteristics, printing resolution set for the present printing operation. The error utilization factor line determining portion 99f determines characteristic values A, B, C, and D for each color component based on the printing resolution.

Figure 16A:
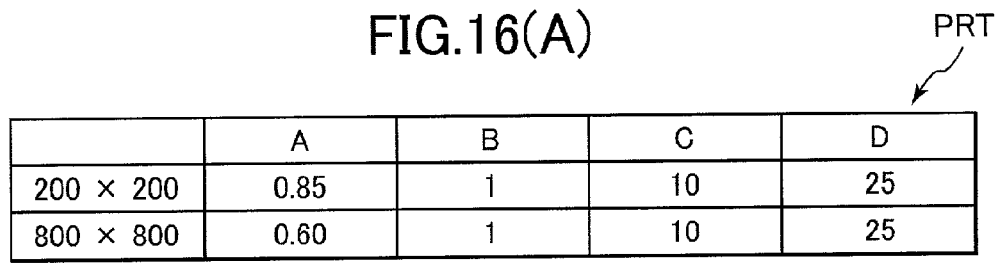
FIG. 16(A) is an explanatory diagram showing an example of a printing resolution-characteristic table PRT used in the multilevel error-diffusion halftone process of a first modification of the second embodiment.

According to the present modification, the hard disk device 10 previously stores therein a printing resolution-characteristic table PRT shown in FIG. 16(A). The printing resolution-characteristic table PRT lists up the characteristic values A, B, C, and D for each of several printing resolutions (200×200 and 800×800, in this example).

It is noted that humans perceive dots differently based on different printing resolutions. Accordingly, characteristic values A, B, C, and D are determined is beforehand for different printing resolutions as shown in FIG. 16(A) and are stored in the hard disk device 10.

According to the present modification, during the process of S2 (FIG. 9), it is judged whether the present printing operation is to be conducted at the resolution of 200×200 or at the resolution of 800×800, while examining the output conditions OC set in S0. If a printing resolution of 200×200 is set in the printer 20, characteristic values A, B, C, and D are set to 0.85, 1, 10, and 25, while referring to the printing resolution-characteristic table PRT. If a printing resolution of 800×800 is set, characteristic values A, B, C, and D are set to 0.60, 1, 10, and 25.

The above-described judging and characteristic-value selecting operations are executed for each of all the six colors of the input image, thereby determining six sets of characteristic values (A, B, C, D) for all the six color components of the input image.

By setting the characteristic values according to the printing resolution, it is possible to improve the quality of the image by increasing error diffusion effects at a printing resolution (200×200, in this example), in which dot particles are not easily perceived, and by increasing dithering effects in highlighted regions at the other printing resolution (800×800, in this example), in which dot particles are easily perceived and false contours stand out.

Second Modification of Second Embodiment

A second modification of the present embodiment will be described with reference to FIGS. 9, 13, and 16(B).

In this modification, the recording characteristic identifying portion 99c identifies, as the recording characteristics, the type of ink used for the present printing operation. The error utilization factor line determining portion 99f determines characteristic values A, B, C, and D for each color component based on the ink type.

Figure 16B:
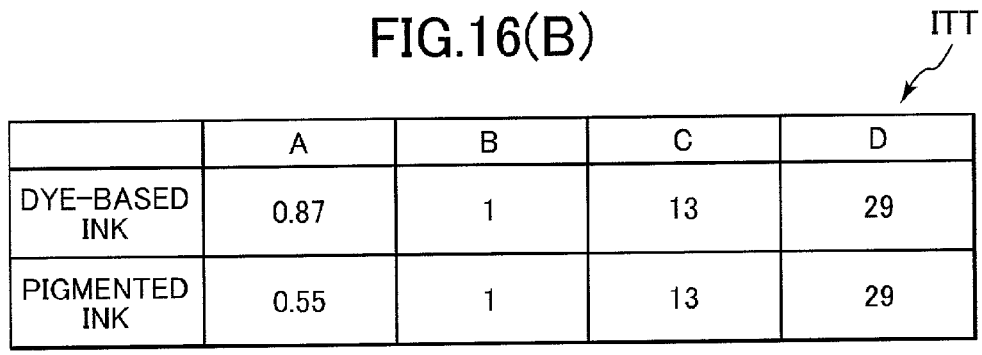
FIG. 16(B) is an explanatory diagram showing an example of an ink type-characteristic table ITT used in the multilevel error-diffusion halftone process of a second modification of the second embodiment.

According to the present modification, the hard disk device 10 previously stores therein an ink type-characteristic table ITT shown in FIG. 16(B). The ink type-characteristic table ITT lists up the characteristic values A, B, C, and D for each of several ink types (dye-based ink and pigmented ink, in this example).

It is noted that humans perceive dots differently when using different types of ink. Accordingly, characteristic values A, B, C, and D that differ according to ink type are determined beforehand as shown in FIG. 16(B), and are stored in the hard disk device 10.

According to the present modification, during the process of S2 (FIG. 9), it is judged whether the present printing operation is to be conducted by using the dye-based ink or the pigmented ink, while examining the output conditions OC set in S0. If a dye-based ink is used in the printer 20, characteristic values A, B, C, and D are set to 0.87, 1, 13, and 29, while referring to the ink type-characteristic table ITT. When a pigmented ink is used, characteristic values A, B, C, and D are set to 0.55, 1, 13, and 29.

The above-described judging and characteristic-value selecting operations are executed for each of all the six colors of the input image, thereby determining six sets of characteristic values (A, B, C, D) for the six color components of the input image.

By setting the characteristic values according to the type of ink used, it is possible to improve the quality of the image by increasing error diffusion effects when using a type of ink (dye-based ink, in this example), in which dot particles are not easily perceived, and by increasing dithering effects in highlighted regions when using the other type of ink (pigmented ink, in this example), in which dot particles are easily perceived and false contours stand out.

Third Modification of Second Embodiment

A third modification of the present embodiment will be described with reference to FIGS. 9, 13, and 16(C).

In this modification, the recording characteristic identifying portion 99c identifies, as the recording characteristics, the volume of an ink droplet for a small dot used for the present printing operation. The error utilization factor line determining portion 99f determines characteristic values A, B, C, and D for each color component based on the ink droplet volume.

Figure 16C:
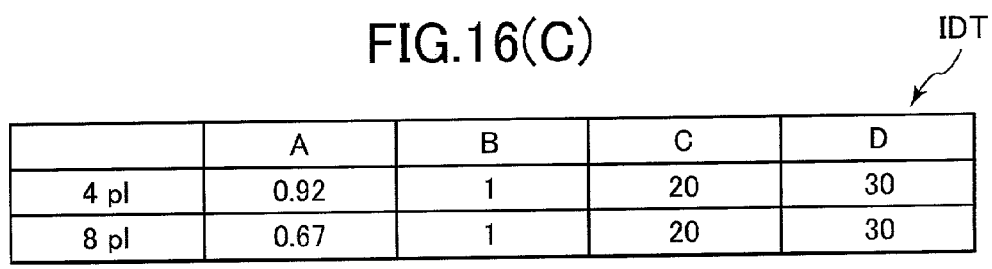
FIG. 16(C) is an explanatory diagram showing an example of an ink deposition-characteristic table IDT used in the multilevel error-diffusion halftone process of a third modification of the second embodiment.

According to the present modification, the hard disk device 10 previously stores therein an ink deposition-characteristic table IDT shown in FIG. 16(C). The ink deposition-characteristic table IDT lists up the characteristic values A, B, C, and D for each of several ink droplet volumes for a, small dot (4 pl and 8 pl, in this example).

It is noted that humans perceive dots differently based on the amount of a single ink droplet deposited on printing medium. Accordingly, characteristic values A, B, C, and D are determined for different volumes of ink droplets beforehand as shown in FIG. 16(C), and are stored in the hard disk device 10.

According to the present modification, during the process of S2 (FIG. 9), it is judged whether the present printing operation is to be conducted by ejecting 4 pl or 8 pl to produce a small dot, while examining the output conditions CO set in S0. If the present printing operation is to be conducted by ejecting an ink droplet with a volume of 4 pl, the characteristic values A, B, C, and D are set to 0.92, 1, 20, and 30, while referring to the ink deposition-characteristic table IDT. When the present printing operation is to be conducted by ejecting an ink droplet with a volume of 8 pl, the characteristic values A, B, C, and D are set to 0.67, 1, 20, and 30.

The above-described judging and characteristic-value selecting operations are executed for each of all the six colors of the input image, thereby determining six sets of characteristic values (A, B, C, D) for all the six color components of the input image.

By setting the characteristic values according to the ink droplet volume, it is possible to improve the quality of the image by increasing error diffusion effects when ejecting ink with such a volume (4 pl, in this example), in which dot particles are not easily perceived, and by increasing dithering effects in highlighted regions when ejecting ink with the other volume (8 pl, in this example), in which dot particles are easily perceived and false contours stand out.

Fourth Modification of Second Embodiment

A fourth modification of the present embodiment will be described with reference to FIGS. 9, 13, and 16(D).

In this modification, the recording characteristic identifying portion 99c identifies, as the recording characteristics, the colors of ink used for the present printing operation. The error utilization factor line determining portion 99f determines characteristic values A, B, C, and D for each ink color component.

Figure 16D:
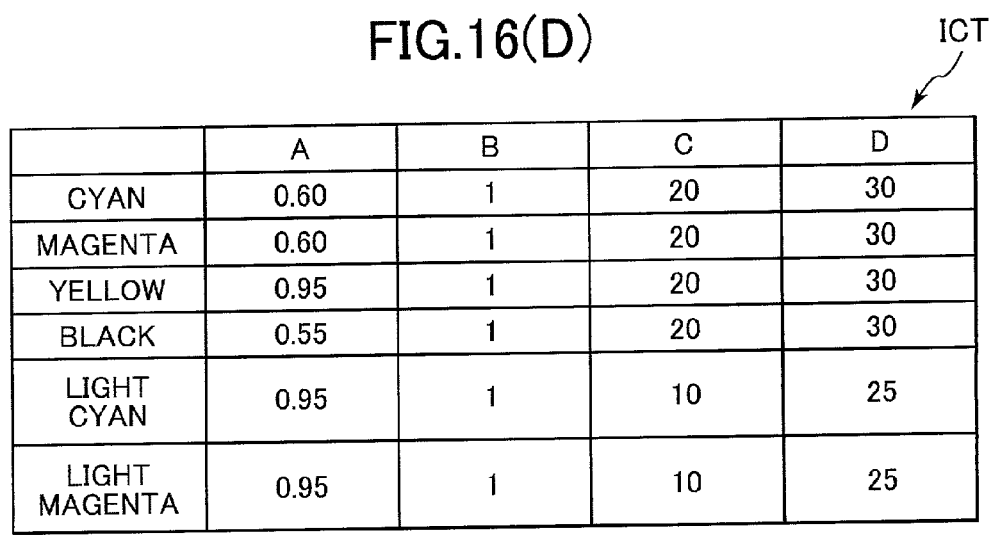
FIG. 16(D) is an explanatory diagram showing an example of an ink color-characteristic table ICT used in the multilevel error-diffusion halftone process of a fourth modification of the second embodiment.

According to the present modification, the hard disk device 10 previously stores therein an ink color-characteristic table ICT shown in FIG. 16(D). The ink color-characteristic table ICT lists up the characteristic values A, B, C, and D for each of several ink colors (cyan, magenta, yellow, black, light cyan, and light magenta, in this example).

It is noted that humans perceive dots differently based on the color of ink used. Accordingly, the characteristic values A, B, C, and D are determined for different ink colors beforehand as shown in FIG. 16(D) and are stored as an ink color-characteristic table ICT in the hard disk device 10.

According to the present modification, during the process of S2 (FIG. 9), it is judged which ink color is to be used for the present printing operation, while examining the output conditions CO set in S0. If the printing operation is to be conducted by using cyan, magenta, yellow, black, light cyan, and light magenta, the characteristic values A, B, C, and D for cyan are set to 0.60, 1, 20, and 30, the characteristic values A, B, C, and D for magenta are set to 0.60, 1, 20, and 30, the characteristic values A, B, C, and D for yellow are set to 0.95, 1, 20, and 30, the characteristic values A, B, C, and D for black are set to 0.55, 1, 20, and 30, the characteristic values A, B, C, and D for light cyan are set to 0.95, 1, 10, and 25, and the characteristic values A, B, C, and D for light magenta are set to 0.95, 1, 10, and 25, while examining the ink color-characteristic table ICT.

By setting the characteristic values according to the ink color, it is possible to improve the quality of the image by increasing error diffusion effects for such an ink color (yellow, in this example), in which dot particles are not easily perceived, and by increasing dithering effects in highlighted regions for another ink color (black, in this example), in which dot particles are easily perceived and false contours stand out.

Third Embodiment

Next will be described a third embodiment of the present invention with reference to FIGS. 9, 17(A) and 17(B).

Figure 17A:
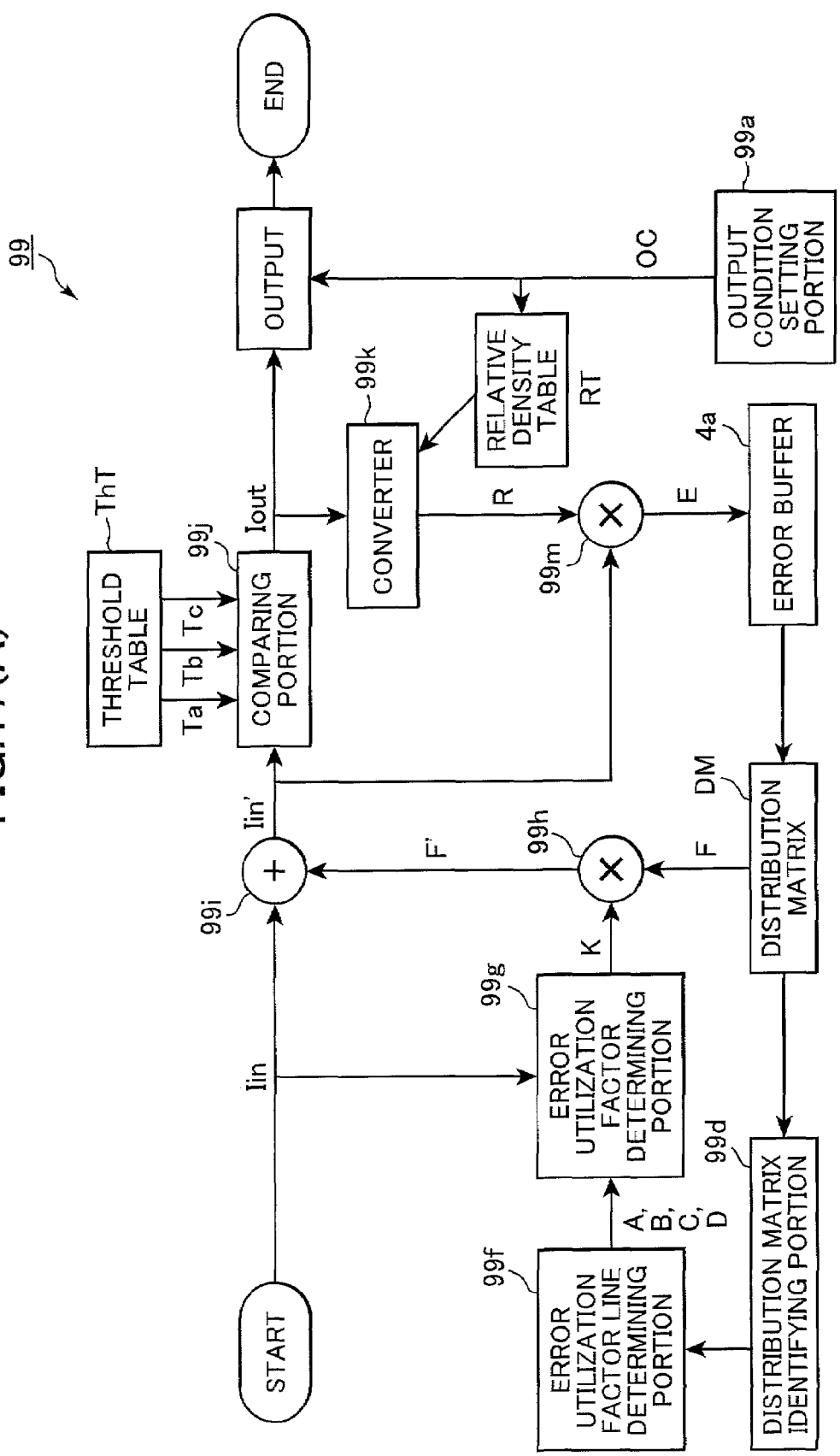
FIG. 17(A) is a functional block diagram showing the multilevel error-diffusion halftone process according to a third embodiment.

As shown in FIG. 17(A), according to the present embodiment, the halftone module 99 is not provided with the image characteristic identifying portion 99b or the recording characteristic identifying portion 99c, but is provided with a distribution matrix identifying portion 99d. The distribution matrix identifying portion 99d is for identifying the size of the distribution matrix DM to be used during the halftone process for each color component. The error utilization factor line determining portion 99f determines characteristic values A, B, C, and D for each color component based on the distribution matrix size identified for the corresponding color.

Similarly to the first and second embodiments, the distribution matrix identifying portion 99d and the error utilization factor line determining portion 99f cooperate to determine the characteristic values A, B, C, and D for each of all the six color components of the image, and to determine the error utilization factor line of FIG. 10 for each of all the six color components of the image. The error utilization factor line determining portion 99f therefore determines six sets of characteristic values A, B, C, and D representing six error utilization factor lines for all the six halftone processes to be conducted for the six color components of a single input image.

Figure 17B:
FIG. 17(B) is an explanatory diagram showing an example of a distribution matrix size-characteristic table DST used in the multilevel error-diffusion halftone process of the third embodiment.

According to the present embodiment, the hard disk device 10 previously stores therein a distribution matrix size-characteristic table DST shown in FIG. 17(B). The distribution matrix size-characteristic table DST lists up the characteristic values A, B, C, and D for each of several sizes of distribution matrices (3×5 and 2×2, in this example).

It is noted that dot occurrence delay varies according to the size of the distribution matrix DM. Accordingly, the characteristic values A, B, C, and D are determined for different distribution matrix sizes beforehand as shown in FIG. 17(B) and are stored in the hard disk device 10.

The characteristic value determining process of S2 (FIG. 9) according to the present embodiment will be described below.

According to the present embodiment, during the process of S2, the size of the distribution matrix DM used for the halftone process is identified based on the distribution matrix DM that has been set in S0 (FIG. 9). More specifically, it is judged whether the halftone process is to be conducted with using a 3×5 sized distribution matrix DM or a 2×2 sized distribution matrix DM, while examining the size of the distribution matrix DM set in S0. If the distribution matrix DM set in S0 has a size of 3×5 as shown in FIG. 7(C), the characteristic values A, B, C, and D are set to 0.50, 1, 10, and 20, while referring to the distribution matrix size-characteristic table DST. If the distribution matrix has a size of 2×2, the characteristic values A, B, C, and D are set to 0.90, 1, 10, and 20.

The above-described judging and characteristic-value selecting operations are executed for each of all the six colors of the input image, thereby determining six sets of characteristic values (A, B, C, D) for all the six color components of the input image.

By setting the characteristic values according to the size of the distribution matrix, it is possible to improve the quality of the image by increasing error diffusion effects when using a distribution matrix of such a size (2×2 matrix) that tends not to generate dot delay, and by increasing dithering effects when using another distribution matrix (3×5 matrix) that tends to generate dot delay.

Fourth Embodiment

Next will be described a fourth embodiment of the present invention with reference to FIGS. 9 and 18.

Figure 18:
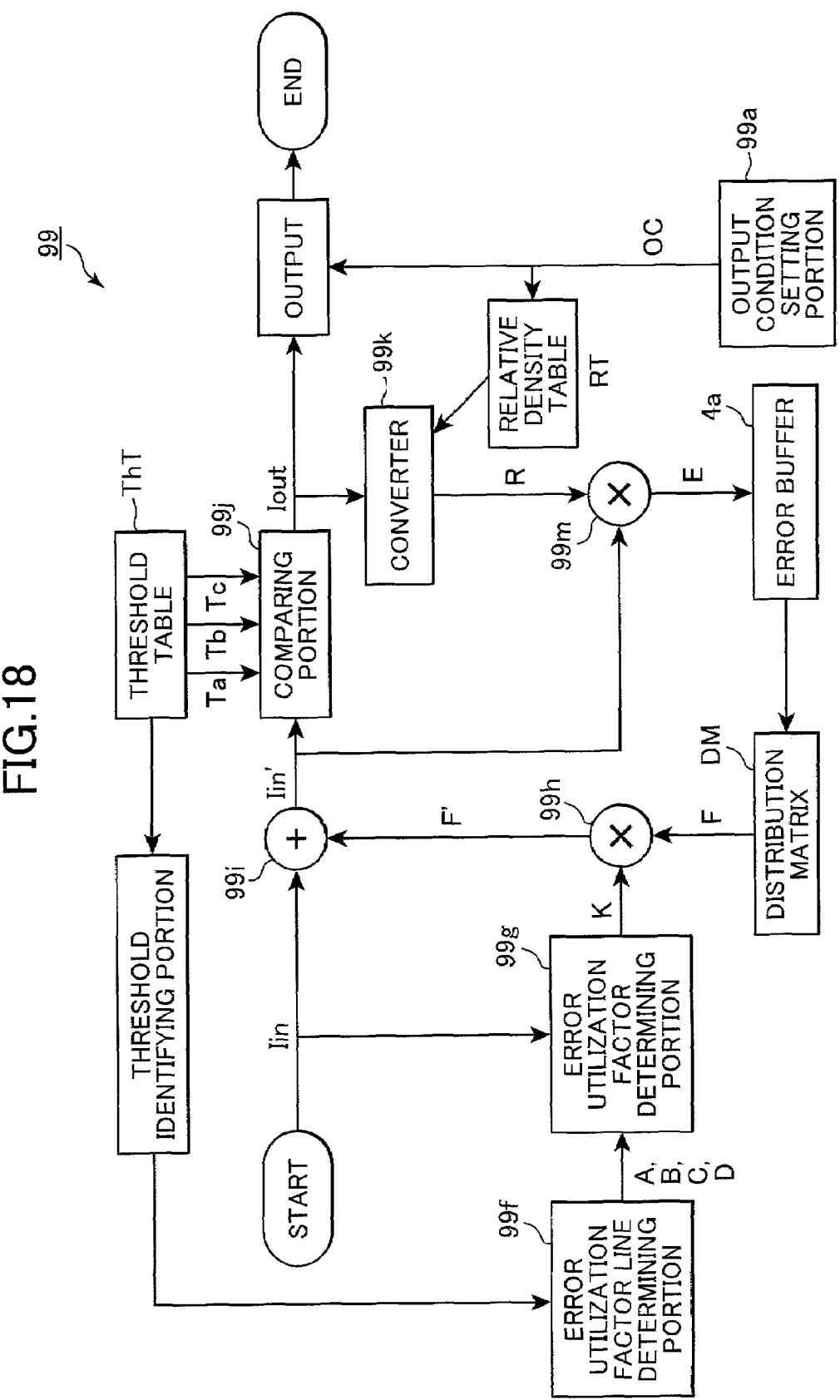
FIG. 18 is a functional block diagram showing the multilevel error-diffusion halftone process according to a fourth embodiment.

As shown in FIG. 18, according to the present embodiment, the halftone module 99 is not provided with the image characteristic identifying portion 99b, the recording characteristic identifying portion 99c, or the distribution matrix identifying portion 99d, but is provided with a threshold identifying portion 99e. The threshold identifying portion 99e is for identifying, for each color component, the value of the threshold Tc, which is the threshold for small dot (the smallest threshold among the three thresholds Ta, Tb, and Tc). The error utilization factor line determining portion 99f determines characteristic values A, B, C, and D for each color component, based on the threshold Tc identified for the corresponding color component.

Similarly to the first through third embodiments, the threshold identifying portion 99e and the error utilization factor line determining portion 99f cooperate to determine the characteristic values A, B, C, and D for each of all the six color components of the image, and to determine the error utilization factor line of FIG. 10 for each of all the six color components of the Image. The error utilization factor line determining portion 99f therefore determines six sets of characteristic values A, B, C, and D representing six error utilization factor lines for all the six halftone processes to be conducted for the six color components of a single input image.

The characteristic value determining process of S2 (FIG. 9) according to the present embodiment will be described below.

It is noted that also in this embodiment, six sets of characteristic values (A, B, C, D) are determined for all the six color components, respectively The six sets of characteristic values (A, B, C, D) are determined in the same manner with one another. The following description will therefore be given for the case where one set of characteristic values (A, B, C, D) is determined for cyan color component.

According to the present embodiment, during the process of S2, the value of the threshold Tc, which has been set for one color component (cyan color, in this example) in S0 (FIG. 9), is retrieved from the RAM 4.

It is noted that delay of dot occurrence varies according to the magnitude of the thresholds used for the multi-level halftone processes in error diffusion. Accordingly, the characteristic values A, B, C, and D are determined based on the threshold value Tc, as shown in the following equations (14)-(17), for the subject color component:

$$A = [-1 \times \text{"thre"}/255] + 1 \quad (14)$$

$$B = 1 \quad (15)$$

$$C = 10 \quad (16)$$

$$D = 20 \quad (17)$$

wherein "thre" is the value of the threshold Tc.

The above-described threshold-retrieving and calculating operations are repeatedly executed for all the six colors of the input image in the same manner as described above, thereby determining six sets of characteristic values (A, B, C, D) for all the six color components of the input image.

By setting the characteristic values as described above, it is possible to improve the quality of the image by increasing dithering effects when using thresholds that tend to generate dot occurrence delay, and by increasing error diffusion effects when using thresholds that tend not to generate dot occurrence delay.

As described above, according to the above-described embodiments, the error utilization factor line, indicative of a relationship between the amount of the error utilization factor K and input data for a present pixel, is determined dependently on characteristics of the image, on the value of the threshold, on the size of the distribution matrix, or on the condition of the recording operation. The amount of the error utilization factor K is determined dependently on the input data of the present pixel and based on the error utilization factor line. The correction amount F, collected from the already-processed nearby pixel, is multiplied by the error utilization factor K, before being added to the input data of the present pixel for the halftone process. Accordingly, it is possible to improve the quality of the image by increasing dithering effects when dot occurrence delay or false contours will highly possibly occur, and by increasing error diffusion effects when dot occurrence delay or false contours will not occur.

While the invention has been described in detail with reference to specific embodiments thereof, it would be apparent to those skilled in the art that many modifications and variations may be made therein without departing from the spirit of the invention, the scope of which is defined by the attached claims.

For example, in the above-described embodiments, the halftone module 99 executes the multilevel halftone process by using the plurality of thresholds Ta, Tb, and Tc. However, the halftone module 99 may be modified to execute the bi-level halftone process. In this case, the threshold table ThT (FIG. 7(A)) stores therein only one threshold T for each of six ink colors. The relative density table RT (FIG. 7(B)) stores therein only two relative density values "255" (forming-dot) and "0" (forming-no-dot) for each of six ink colors. If the corrected input value Iin' is greater than or equal to the threshold value T, the output value Iout is turned ON to have a value of one (1) indicative of an output of a dot. The output value Iout is converted into the relative density value "255". If the corrected input value Iin' is smaller than the threshold value T, the output value Iout is turned OFF to have a value of zero (0) indicative of an output of no dot. The output value Iout is converted into the relative density value of "0".

When executing the bi-level halftone process, the value of "thre" in the equation (14) of the fourth embodiment is set to the value of the threshold T. During the process of S2 in the third modification of the second embodiment, it is judged whether or not the printer 22 is controlled to eject an ink droplet with a droplet amount of 4 pl or 8 pl.

In the embodiments described above, the output conditions OC are set in S0 at the computer 90 side. However, the output conditions OC may be set at the printer 22 side. In such a case, the computer 90 merely receives information of the output conditions OC from the printer 22.

Figure 19:
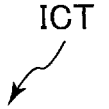
FIG. 19 is an explanatory diagram showing an example of the ink color-characteristic table ICT used for a four-color printer.

In the embodiments described above, the printer 22 is designed to print six colors. However, the present invention is not limited to the six-color printer, but can be applied to any printers that print any number of colors. When the printer 22 is of a type that prints four colors (cyan, magenta, yellow, and black), for example, the ink color-characteristic table ICT of FIG. 16(D) may be modified as shown in FIG. 19 so as to list up the characteristic values A, B, C, and D only for the four colors.

In the embodiments described above, in S1, CMYKLcLm image data for all the pixels within one image is extracted from the color correction module 99, and the halftone process of FIG. 9 is executed until all the image data in the input image is completely processed. It is noted that the one image may be defined by all the lines constituting one page, wherein each line extending in the main scanning direction X. In this case, CMYKLcLm image data for all the pixels within the entire page's worth of image is extracted from the color correction module 99 in S1. Alternatively, the one image may be defined by only several lines within one page. In this case, CMYKLcLm image data for the pixels within the several lines' worth of image is extracted from the color correction module 99 in S1. In such a case, the halftone process of S0-S16 are repeatedly executed until the entire page's worth of image is processed.

The error utilization factor line is not limited to the shape shown in FIG. 10, but may be modified in a manner that the error utilization factor line can determine how the error utilization factor K changes dependently on the characteristic values A-D. Similarly, the definition of the characteristic values A-D is not limited to those in the above-described embodiments, but may be modified in various manners.

In the embodiments described above, the halftone process (halftone module 99) is executed by the CPU 2 provided in the personal computer 90. In this way, the functions for executing the halftone process are implemented as the image processing program 99. The image processing program 99 can be originally stored in a storage medium, such as a CD-ROM, and read into the RAM 4 via the CD-ROM device 8 and executed by the CPU 2. The image processing program 99 can be downloaded from the Internet via the NCU 14 into the hard disk device 10.

What is claimed is:

1. An image processing device, comprising:
   an image characteristic identifying portion receiving input data indicative of all pixels within the image and identifying characteristics of the image;
   an inputting portion receiving input data indicative of one pixel within an image;
   a correction amount setting portion setting a correction amount based on an error value determined for at least one adjacent pixel that has been already-processed and that is located near to a subject pixel, the correction amount setting portion setting the correction amount by collecting a portion of the error value for the at least one adjacent pixel by using a distribution matrix;
   a correction amount adjusting portion adjusting the correction amount by multiplying the correction amount by an error utilization factor to obtain an adjusted correction amount;
   a correcting portion correcting the input data indicative of one pixel by the adjusted correction amount, thereby converting the input data indicative of one pixel into corrected data; and
   a converting portion performing a conversion process to convert the corrected data into an output data while calculating an error value obtained through the conversion process for the subject pixel,
   wherein the image characteristic identifying portion includes:
   a density range determining portion determining a density range where a false contour will possibly be generated; and
   a ratio determining portion determining a ratio of the number of pixels, whose densities are within the density range, with respect to a total number of pixels in the image.

2. An image processing device, comprising:
   an inputting portion receiving input data indicative of one pixel within an image;
   a correction amount setting portion setting a correction amount based on an error value determined for at least one adjacent pixel that has been already-processed and that is located near to a subject pixel, the correction amount setting portion setting the correction amount by collecting a portion of the error value for the at least one adjacent pixel by using a distribution matrix;
   a correction amount adjusting portion adjusting the correction amount by multiplying the correction amount by an error utilization factor to obtain an adjusted correction amount;
   a correcting portion correcting the input data by the adjusted correction amount, thereby converting the input data into corrected data; and
   a converting portion performing a conversion process to convert the corrected data into an output data while calculating an error value obtained through the conversion process for the subject pixel,
   wherein the converting portion includes:
   a threshold storing portion storing at least one preset threshold;
   a comparing portion comparing the corrected data with at least one of the at least one preset threshold;
   an outputting portion outputting the output data that is determined based on results of a comparison performed by the comparing portion;
   a relative density setting portion setting a relative density value based on the output data; and
   an error calculating portion calculating an error value for the subject pixel based on a difference between the corrected data and the relative density value; and
   wherein the correction amount adjusting portion determines the error utilization factor solely depending on the input data and one of the at least one preset threshold.

3. An image processing device, comprising:
   an inputting portion receiving input data indicative of one pixel within an image;
   a correction amount setting portion setting a correction amount based on an error value determined for at least one adjacent pixel that has been already-processed and that is located near to a subject pixel, the correction amount setting portion setting the correction amount by collecting a portion of the error value for the at least one adjacent pixel by using a distribution matrix;

a correction amount adjusting portion adjusting the correction amount by multiplying the correction amount by an error utilization factor to obtain an adjusted correction amount;
a correcting portion correcting the input data by the adjusted correction amount, thereby converting the input data into corrected data; and
a converting portion performing a conversion process to convert the corrected data into an output data while calculating an error value obtained through the conversion process for the subject pixel,
wherein the converting portion includes:
a threshold storing portion storing at least one preset threshold;
a comparing portion comparing the corrected data with at least one of the at least one preset threshold;
an outputting portion outputting the output data that is determined based on results of a comparison performed by the comparing portion;
a relative density setting portion setting a relative density value based on the output data; and
an error calculating portion calculating an error value for the subject pixel based on a difference between the corrected data and the relative density value;
wherein the error utilization factor is greater than or equal to zero and smaller than or equal to 1;
wherein the correction amount adjusting portion includes:
an error utilization factor line determining portion determining an error utilization factor line indicative of a relationship between an amount of the error utilization factor and the input data; and
an error utilization factor determining portion determining the amount of the error utilization factor depending on the input data and based on the error utilization factor line; and
wherein the error utilization factor line determining portion determines the error utilization factor line solely depending on one of the at least one preset threshold.

4. An image processing device, comprising:
an inputting portion receiving input data indicative of one pixel within an image;
a correction amount setting portion setting a correction amount based on an error value determined for at least one adjacent pixel that has been already-processed and that is located near to a subject pixel, the correction amount setting portion setting the correction amount by collecting a portion of the error value for the at least one adjacent pixel by using a distribution matrix;
a correction amount adjusting portion adjusting the correction amount by multiplying the correction amount by an error utilization factor to obtain an adjusted correction amount;
a correcting portion correcting the input data by the adjusted correction amount, thereby converting the input data into corrected data;
a converting portion performing a conversion process to convert the corrected data into an output data while calculating an error value obtained through the conversion process for the subject pixel;
an image characteristic identifying portion receiving input data indicative of all pixels within the image and identifying characteristics of the image; and
an adjustment characteristic modifying portion modifying an adjustment characteristic of the correction amount adjusting portion based on results of identification by the image characteristic identifying portion, the correction amount adjusting portion determining the error utilization factor based on the modified adjustment characteristics and on the input data,
wherein the converting portion includes:
a threshold storing portion storing a preset threshold;
a comparing portion comparing the corrected data with the preset threshold;
an outputting portion outputting the output data that is determined based on results of a comparison performed by the comparing portion;
a relative density setting portion setting a relative density value based on the output data; and
an error calculating portion calculating an error value for the subject pixel based on a difference between the corrected data and the relative density value; and
wherein the image characteristic identifying portion includes:
a density range determining portion determining a density range where a false contour will possibly be generated; and
a ratio determining portion determining a ratio of the number of pixels, whose densities are within the density range, with respect to a total number of pixels in the image.

5. An image processing device, comprising:
an inputting portion receiving input data indicative of one pixel within an image;
a correction amount setting portion setting a correction amount based on an error value determined for at least one adjacent pixel that has been already-processed and that is located near to a subject pixel, the correction amount setting portion setting the correction amount by collecting a portion of the error value for the at least one adjacent pixel by using a distribution matrix;
a correction amount adjusting portion adjusting the correction amount by multiplying the correction amount by an error utilization factor to obtain an adjusted correction amount;
a correcting portion correcting the input data by the adjusted correction amount, thereby converting the input data into corrected data;
a converting portion performing a conversion process to convert the corrected data into an output data while calculating an error value obtained through the conversion process for the subject pixel;
an image characteristic identifying portion receiving input data indicative of all pixels within the image and identifying characteristics of the image;
an adjustment characteristic modifying portion modifying an adjustment characteristic of the correction amount adjusting portion based on results of identification by the image characteristic identifying portion, the correction amount adjusting portion determining the error utilization factor based on the modified adjustment characteristics and on the input data; and
an image recording portion recording an image on a recording medium based on the output data, while conveying the recording medium in a recording medium conveying direction,
wherein the converting portion includes:
a threshold storing portion storing a preset threshold;
a comparing portion comparing the corrected data with the preset threshold;
an outputting portion outputting the output data that is determined based on results of a comparison performed by the comparing portion;
a relative density setting portion setting a relative density value based on the output data; and
an error calculating portion calculating an error value for the subject pixel based on a difference between the corrected data and the relative density value, and
wherein the image characteristic identifying portion includes:

a density range determining portion determining a density range where a false contour will possibly be generated; and a ratio determining portion determining a ratio of the number of pixels, whose densities are within the density range and whose density gradient with respect to the recording medium conveying direction has a negative value, with respect to a total number of pixels in the image.

6. An image processing device, comprising:

an inputting portion receiving input data indicative of one pixel within an image;

a correction amount setting portion setting a correction amount based on an error value determined for at least one adjacent pixel that has been already-processed and that is located near to a subject pixel, the correction amount setting portion setting the correction amount by collecting a portion of the error value for the at least one adjacent pixel by using a distribution matrix;

a correction amount adjusting portion adjusting the correction amount by multiplying the correction amount by an error utilization factor to obtain an adjusted correction amount;

a correcting portion correcting the input data by the adjusted correction amount, thereby converting the input data into corrected data;

a converting portion performing a conversion process to convert the corrected data into an output data while calculating an error value obtained through the conversion process for the subject pixel;

wherein the converting portion includes:

a threshold storing portion storing at least one preset threshold;

a comparing portion comparing the corrected data with at least one of the at least one preset threshold;

an outputting portion outputting the output data that is determined based on results of a comparison performed by the comparing portion;

a relative density setting portion setting a relative density value based on the output data; and an error calculating portion calculating an error value for the subject pixel based on a difference between the corrected data and the relative density value;

a threshold identifying portion identifying one of the at least one preset threshold; and an adjustment characteristic modifying portion modifying an adjustment characteristic of the correction amount adjusting portion solely depending on the one of the at least one preset threshold identified by the threshold characteristic identifying portion, the correction amount adjusting portion determining the error utilization factor based on the modified adjustment characteristics and on the input data.

7. An computer-readable medium that stores an image processing program executable by a data processing device, the program comprising:

instructions for receiving input data indicative of all pixels within an image and identifying characteristics of the image;

instructions for receiving input data indicative of one pixel within an image;

instructions for setting a correction amount based on an error value determined for at least one adjacent pixel that has been already-processed and that is located near to a subject pixel, the instructions for setting a correction amount setting the correction amount by collecting a portion of the error value for the at least one adjacent pixel by using a distribution matrix;

instructions for adjusting the correction amount, the instructions for adjusting the correction amount comprising instructions for multiplying the correction amount by an error utilization factor to obtain an adjusted correction amount;

instructions for correcting the input data indicative of one pixel by the adjusted correction amount, thereby converting the input data indicative of one pixel into corrected data; and instructions for performing a conversion process to convert the corrected data into an output data while calculating an error value obtained through the conversion process for the subject pixel, wherein the instructions for identifying characteristics of the image are comprised of:

instructions for determining a density range where a false contour will possibly be generated; and instructions for determining a ratio of the number of pixels, whose densities are within the density range, with respect to a total number of pixels in the image.

8. A computer-readable medium that stores an image processing program executable by a data processing device, the program comprising:

instructions for receiving input data indicative of one pixel within an image;

instructions for setting a correction amount based on an error value determined for at least one adjacent pixel that has been already-processed and that is located near to a subject pixel, the instructions for setting a correction amount setting the correction amount by collecting a portion of the error value for the at least one adjacent pixel by using a distribution matrix;

instructions for adjusting the correction amount, the instructions for adjusting the correction amount comprising instructions for multiplying the correction amount by an error utilization factor to obtain an adjusted correction amount;

instructions for correcting the input data by the adjusted correction amount, thereby converting the input data into corrected data; and instructions for performing a conversion process to convert the corrected data into an output data while calculating an error value obtained through the conversion process for the subject pixel, wherein the instructions for performing the conversation process comprise:

instructions for comparing the corrected data with at least one of at least one preset threshold to obtain a compared result;

instructions for outputting the output data that is determined based on the compared result;

instructions for setting a relative density value based on the output data; and instructions for calculating an error value for the subject pixel based on a difference between the corrected data and the relative density value; and wherein the instructions for adjusting the correction amount comprise instructions for determining the error utilization factor solely depending on the input data and one of the at least one preset threshold.

* * * * *